(12) United States Patent
Volkerink et al.

(10) Patent No.: US 12,363,507 B2
(45) Date of Patent: Jul. 15, 2025

(54) WIRELESS TRACKING DEVICE FOR AIR CARGO CONTAINERS AND ASSETS LOADED ONTO AIRCRAFT

(71) Applicant: Trackonomy Systems, Inc., San Jose, CA (US)

(72) Inventors: Hendrik J. Volkerink, Palo Alto, CA (US); Ajay Khoche, West San Jose, CA (US); Raymundo Alatorre Mercado, Tracy, CA (US); Prabhat Verma, Fremont, CA (US); Aaron Storrs, Santa Cruz, CA (US); Donald D. Do, San Jose, CA (US); Nicolas Lee, San Jose, CA (US); Saurabh Sanghai, Cupertino, CA (US)

( * ) Notice: Subject to any disclaimer, the term of this patent is extended or adjusted under 35 U.S.C. 154(b) by 0 days.

(21) Appl. No.: 18/617,529

(22) Filed: Mar. 26, 2024

(65) Prior Publication Data

US 2024/0267708 A1 Aug. 8, 2024

Related U.S. Application Data

(63) Continuation-in-part of application No. 18/433,227, filed on Feb. 5, 2024, now Pat. No. 12,236,397.

(Continued)

(51) Int. Cl.
*H04W 4/029* (2018.01)
*G06K 19/06* (2006.01)
*H04W 84/18* (2009.01)

(52) U.S. Cl.
CPC ...... *H04W 4/029* (2018.02); *G06K 19/06037* (2013.01); *H04W 84/18* (2013.01)

(58) Field of Classification Search
CPC ....... H04W 4/029; H04W 84/18; H04W 4/35; G06K 19/06037
See application file for complete search history.

(56) References Cited

U.S. PATENT DOCUMENTS

| 4,785,463 A | 11/1988 | Janc et al. |
| 5,779,839 A | 7/1998 | Tuttle et al. |

(Continued)

FOREIGN PATENT DOCUMENTS

| AU | 2018204317 A1 | 1/2019 |
| CA | 3008512 A1 | 12/2018 |

(Continued)

OTHER PUBLICATIONS

International Search Report and Written Opinion for PCT/US2024/014516 dated Jul. 16, 2024, 21 pages.

(Continued)

*Primary Examiner* — Garcia Ade

(57) ABSTRACT

An anchor-slot tape node may include a circuit board configured with a processor, memory, sensors, and a low-power wireless communication interface. The anchor-slot tape node may include a stiffener positioned over the circuit board. The anchor-slot tape node may include a battery positioned beneath the circuit board. The anchor-slot tape node may include an outer casing enclosing the battery, the circuit board, and the stiffener, wherein the anchor-slot tape node is shaped and sized to fit within an anchor-slot of a ULD pallet and to be retained within the anchor-slot by friction between the outer casing and internal structure of the anchor-slot.

24 Claims, 25 Drawing Sheets

Related U.S. Application Data

(60) Provisional application No. 63/460,592, filed on Apr. 19, 2023, provisional application No. 63/443,155, filed on Feb. 3, 2023.

(56) References Cited

U.S. PATENT DOCUMENTS

| | | |
|---|---|---|
| 6,429,810 B1 | 8/2002 | De |
| 6,437,702 B1 | 8/2002 | Ragland et al. |
| 6,522,874 B1 | 2/2003 | Chu et al. |
| 6,972,682 B2 | 12/2005 | Wagner et al. |
| 7,273,172 B2 | 9/2007 | Olsen et al. |
| 7,696,862 B2 | 4/2010 | Herschell et al. |
| 7,866,555 B2 | 1/2011 | Schmid et al. |
| 7,922,085 B2 | 4/2011 | Thomas et al. |
| 8,095,070 B2 | 1/2012 | Twitchell |
| 8,413,997 B1 | 4/2013 | Coombs et al. |
| 9,721,226 B2 | 8/2017 | Minogue et al. |
| 9,886,799 B2 | 2/2018 | Kwak |
| 10,244,364 B1 | 3/2019 | Beard |
| 10,679,172 B2 | 6/2020 | Burch et al. |
| 10,748,109 B2 | 8/2020 | Benjamin et al. |
| 11,115,732 B2 | 9/2021 | Lucrecio et al. |
| 11,487,985 B2 | 11/2022 | Volkerink et al. |
| 11,527,148 B1* | 12/2022 | Volkerink .............. G08B 25/10 |
| 2003/0205869 A1 | 11/2003 | Schutt |
| 2003/0227382 A1 | 12/2003 | Breed |
| 2004/0200477 A1* | 10/2004 | Bleys ................... A61M 16/12 |
| | | 128/204.18 |
| 2004/0224630 A1 | 11/2004 | MacFarland |
| 2005/0028504 A1 | 2/2005 | Gramm |
| 2005/0146423 A1 | 7/2005 | Hattori |
| 2006/0087419 A1 | 4/2006 | Peng |
| 2006/0197652 A1 | 9/2006 | Hild et al. |
| 2007/0229240 A1 | 10/2007 | Yasuda |
| 2007/0285240 A1 | 12/2007 | Sensenig et al. |
| 2008/0100450 A1 | 5/2008 | Ayyagari et al. |
| 2008/0122656 A1 | 5/2008 | Carani et al. |
| 2008/0147277 A1 | 6/2008 | Lu et al. |
| 2008/0228352 A1 | 9/2008 | Brookes et al. |
| 2008/0252025 A1 | 10/2008 | Plath |
| 2009/0016308 A1 | 1/2009 | Twitchell |
| 2009/0018721 A1 | 1/2009 | Foss et al. |
| 2009/0265038 A1 | 10/2009 | Ramsey et al. |
| 2012/0191272 A1 | 7/2012 | Andersen et al. |
| 2012/0232942 A1 | 9/2012 | Gaug et al. |
| 2014/0163857 A1 | 6/2014 | Melum et al. |
| 2014/0166857 A1 | 6/2014 | Ookuma |
| 2014/0344118 A1 | 11/2014 | Parpia et al. |
| 2015/0077256 A1 | 3/2015 | Maddox |
| 2015/0194059 A1 | 7/2015 | Starr et al. |
| 2015/0206096 A1 | 7/2015 | Fernandez |
| 2015/0239354 A1 | 8/2015 | Gorai et al. |
| 2015/0248838 A1 | 9/2015 | Stone et al. |
| 2015/0349917 A1 | 12/2015 | Skaaksrud |
| 2016/0066137 A1 | 3/2016 | Kulkarni et al. |
| 2017/0006573 A1 | 1/2017 | Kelly |
| 2017/0140656 A1 | 5/2017 | Mott et al. |
| 2017/0243367 A1 | 8/2017 | Lee et al. |
| 2018/0039266 A1 | 2/2018 | Dotzler et al. |
| 2018/0061252 A1 | 3/2018 | Feng et al. |
| 2018/0096289 A1 | 4/2018 | Terwilliger et al. |
| 2018/0097884 A1 | 4/2018 | Terwilliger et al. |
| 2018/0111698 A1 | 4/2018 | Podnar et al. |
| 2018/0301875 A1 | 10/2018 | Burroughs et al. |
| 2018/0365636 A1 | 12/2018 | Lucrecio et al. |
| 2018/0367872 A1 | 12/2018 | Lucrecio et al. |
| 2019/0039431 A1 | 2/2019 | Vaughan et al. |
| 2019/0101650 A1 | 4/2019 | McKeown et al. |
| 2019/0180622 A1 | 6/2019 | Yang et al. |
| 2019/0210518 A1 | 7/2019 | Michalakis et al. |
| 2019/0222055 A1 | 7/2019 | Khoche et al. |
| 2019/0236732 A1 | 8/2019 | Speasl et al. |
| 2019/0279064 A1 | 9/2019 | Tucker |
| 2019/0315319 A1 | 10/2019 | Williams |
| 2019/0340483 A1 | 11/2019 | Khoche |
| 2020/0051015 A1 | 2/2020 | Davis et al. |
| 2020/0137360 A1 | 4/2020 | Somers et al. |
| 2020/0300960 A1 | 9/2020 | Murphy et al. |
| 2020/0375106 A1 | 12/2020 | Seiders et al. |
| 2021/0031734 A1 | 2/2021 | Wolf et al. |
| 2021/0094377 A1 | 4/2021 | Coerman et al. |
| 2021/0110122 A1 | 4/2021 | Volkerink |
| 2021/0284449 A1 | 9/2021 | Rogers |
| 2021/0319683 A1 | 10/2021 | Daw Perez et al. |
| 2021/0390290 A1 | 12/2021 | Hunt et al. |
| 2022/0032704 A1 | 2/2022 | Desourdy et al. |
| 2022/0058458 A1* | 2/2022 | Lee ...................... H04W 4/029 |
| 2022/0108088 A1* | 4/2022 | Volkerink .......... G06K 19/0723 |
| 2022/0161786 A1 | 5/2022 | Javaid |
| 2023/0028603 A1* | 1/2023 | Volkerink .......... G06K 7/10366 |
| 2023/0252399 A1* | 8/2023 | Khoche .............. G06Q 10/0833 |
| | | 705/333 |

FOREIGN PATENT DOCUMENTS

| | | | |
|---|---|---|---|
| CN | 108665044 A | 10/2018 | |
| WO | 2006080857 A1 | 8/2006 | |
| WO | 2015144210 A1 | 10/2015 | |
| WO | WO-2016115088 A1 * | 7/2016 | ......... G06K 19/0723 |
| WO | 2018053309 A1 | 3/2018 | |
| WO | 2022170006 A1 | 8/2022 | |

OTHER PUBLICATIONS

International Search Report and Written Opinion for PCT/US2024/021536 dated Aug. 22, 2024, 15 pages.
Examination Report for Australian Patent Application No. 2020216093 dated Sep. 29, 2022, 4 pages.
Examination Report No. 1 for Australian Patent Application No. 2020368350 dated Sep. 30, 2022, 6 pages.
Examination Report No. 2 for Australian Patent Application No. 2020368350 dated Apr. 24, 2023, 5 pages.
Examination Report No. 3 for Australian Patent Application No. 2020368350 dated Sep. 21, 2023, 6 pages.
Examination Report No. 4 for Australian Patent Application No. 2020368350 dated Sep. 28, 2023, 5 pages.
International Search Report and Written Opinion for PCT/US2023/028361 dated Dec. 12, 2023, 12 pages.
International Search Report and Written Opinion of the International Searching Authority for International Application No. PCT/US2020/055408, filed Feb. 25, 2021, 11 pages.
Invitation to Pay Additional Fees for International Patent Application No. PCT/US2023/028361 dated Sep. 25, 2023, 3 pages.
Invitation to Pay Additional Fees for International Patent Application No. PCT/US2024/021536 dated Jun. 14, 2024, 3 pages.
Non Final Office Action for U.S. Appl. No. 18/144,751, mailed Mar. 28, 2024, 10 pages.
Non Final Office Action for U.S. Appl. No. 18/433,227, mailed Jun. 6, 2024, 12 pages.
Notice of Allowance for U.S. Appl. No. 17/069,651, mailed Jun. 23, 2022, 14 pages.
Notice of Allowance for U.S. Appl. No. 17/944,972, mailed Feb. 15, 2023, 8 pages.
Office Action for Canadian Application No. 3,128,524, dated Oct. 12, 2022, 6 pages.
Partial Supplementary European Search Report for EP Patent Application No. 20747574.0 dated Sep. 8, 2022, 3 pages.
PCT Application No. PCT/US2020/014521 International Preliminary Report on Patentability, dated Jul. 27, 2021, 6 pages.

* cited by examiner

Adhering A First Tape Node To A First Parcel, The First Tape Node Including A First Type Of Wireless Communication Interface And A Second Type Of Wireless Communication Interface Having A Longer Range Than The First Type Of Wireless Communication Interface ⟋ 990

Adhering A Second Tape Node To A Second Parcel, The Second Tape Node Including The First Type Of Wireless Communication Interface, Wherein The Second Tape Node Is Operable To Communicate With The First Tape Node Over A Wireless Communication Connection Established Between The First Type Of Wireless Communication Interfaces Of The First And Second Tape Nodes ⟋ 992

Establishing, By A Server, A Wireless Communication Connection With The Second Type Of Wireless Communication Interface Of The First Tape Node, And Designating, By The Server, The First Tape Node As A Master Node Of The Second Tape Node ⟋ 994

FIG. 9B

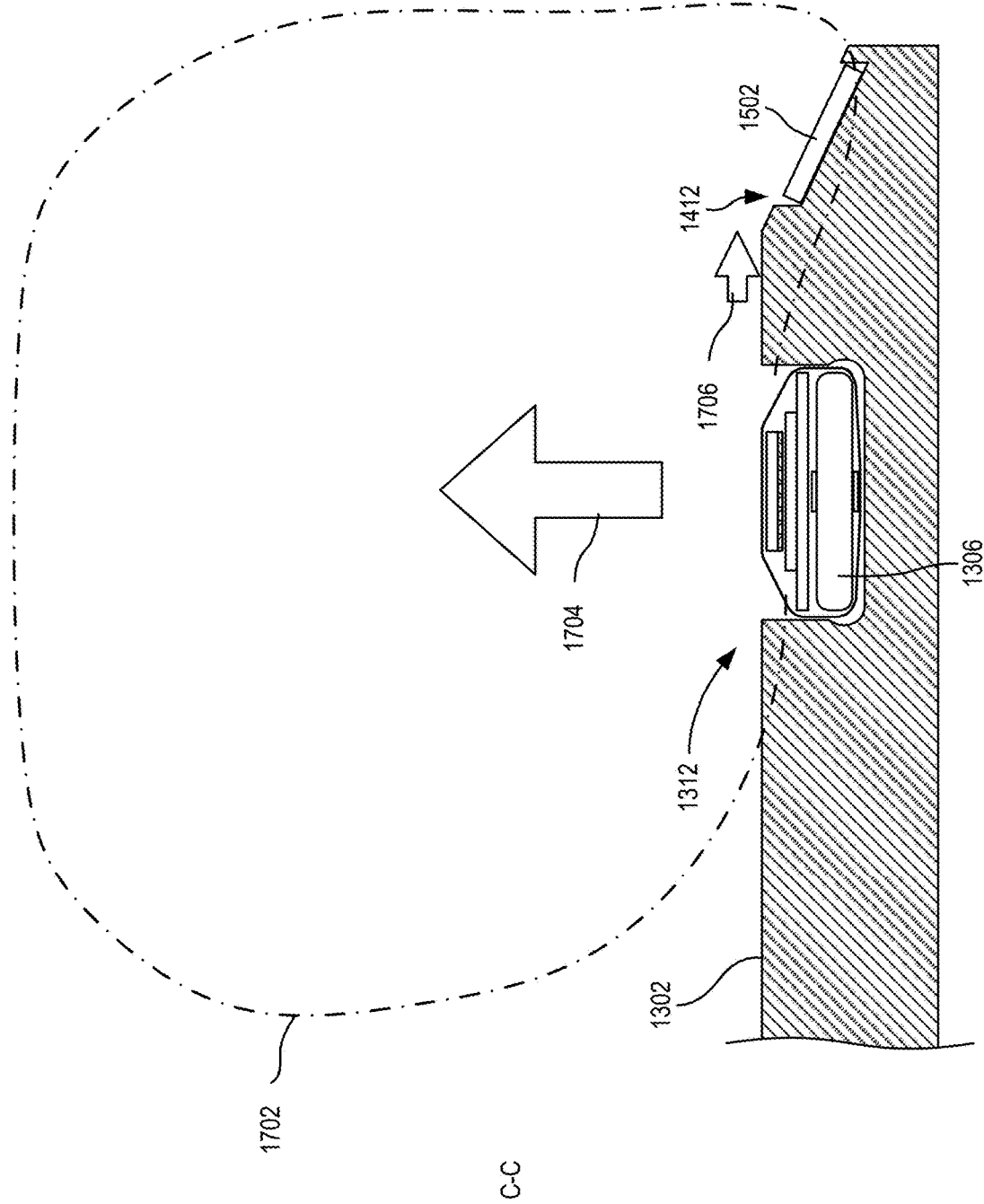

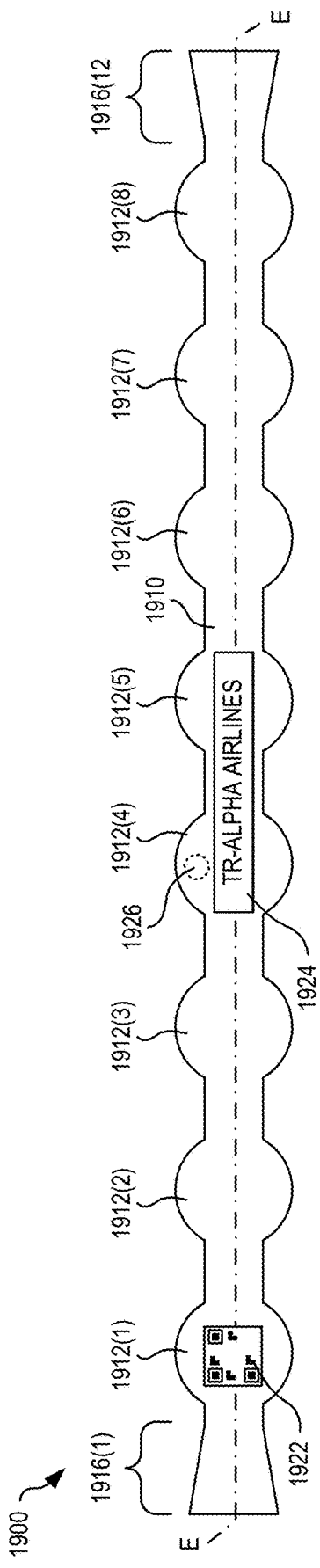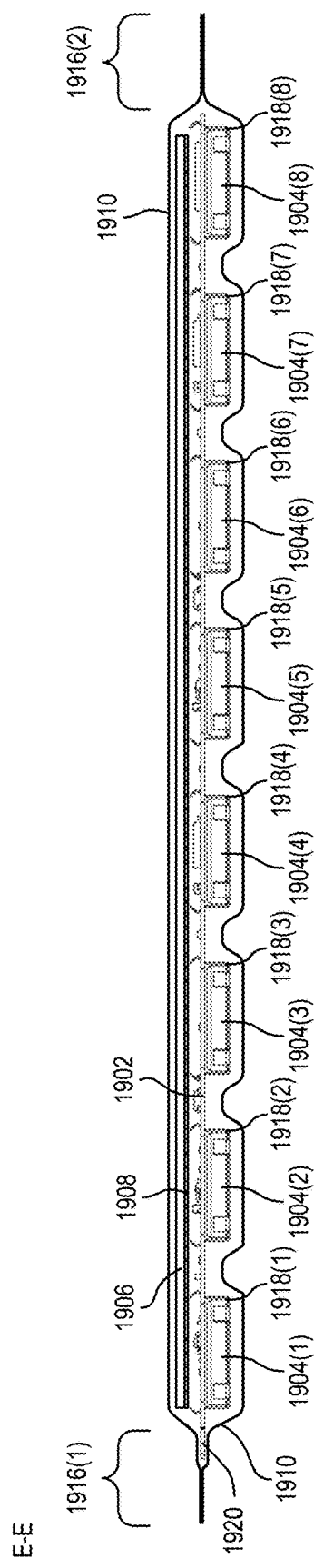
FIG. 19A
FIG. 19B

WIRELESS TRACKING DEVICE FOR AIR CARGO CONTAINERS AND ASSETS LOADED ONTO AIRCRAFT

RELATED APPLICATIONS

This application is a Continuation-in-part of U.S. patent application Ser. No. 18/433,227, titled "Monitoring of Unit Load Device and Carts Using Wireless IoT devices," filed Feb. 5, 2024, which claims priority to U.S. Patent Application No. 63/443,155, filed Feb. 3, 2023 and claims priority from U.S. Patent Application No. 63/460,592, filed Apr. 19, 2023, each of which is incorporated herein by reference in its entirety.

FIELD OF THE DISCLOSURE

This disclosure generally relates to wireless internet of things (IoT) devices.

BACKGROUND

Incorrect handling of a unit load device (ULD) at a transportation facility results in costly delays and/or lost assets, particularly where the ULD departs on the wrong vehicle.

SUMMARY

One aspect of the present embodiments includes the realization that attaching a tape node type tracking device to pallet type of a universal load device (ULD) in a location where it is not easily damaged is difficult. Assets are positioned on a top flat surface of the ULD pallet, and therefore any tape node positioned on that surface is easily damaged. The underside of the ULD pallet bears the weight of the assets when supported on the ground or other equipment and therefore a tape node positioned on the bottom surface is soon damages. The present embodiments solve this problem by using a tracking device positioned in an anchor-slot of the ULD pallet.

In certain embodiments, the techniques described herein relate to an anchor-slot tape node for tracking a unit load device (ULD) pallet having an anchor-slot formed around a perimeter thereof, including: a circuit board configured with a processor, memory, sensors, and a low-power wireless communication interface; a stiffener positioned over the circuit board; a battery positioned beneath the circuit board; and an outer casing enclosing the battery, the circuit board, and the stiffener; wherein the anchor-slot tape node is shaped and sized to fit within the anchor-slot and to be retained within the anchor-slot by friction between the outer casing and internal structure of the anchor-slot.

In certain embodiments, the techniques described herein relate to a system for tracking a unit load device (ULD) pallet, including: a cloud based server; an anchor-slot tape node shaped and sized to be retained within an anchor-slot of the ULD pallet; and a gateway node; wherein, when in communication range, the anchor-slot tape node and the gateway node form a mesh network that allows the anchor-slot tape node to communicate with the cloud based server to track the ULD pallet.

In certain embodiments, the techniques described herein relate to a system for tracking a unit load device (ULD) pallet, including: an anchor-slot tape node shaped and sized to be retained within an anchor-slot of the ULD pallet; and a companion tape node having an adhesive surface for attaching to the ULD pallet within a recessed area at an edge of the ULD pallet; wherein the companion tape node communicate with a cloud based server via a mesh network including a gateway node to track the ULD pallet.

In certain embodiments, the techniques described herein relate to an anchor-ring tape node for tracking a unit load device (ULD) pallet having an anchor-slot formed around a perimeter thereof, including: an anchor portion shaped and sized to be secured within the anchor-slot; a stem portion mechanically coupled with the anchor portion and forming a housing that includes a wireless tracking circuit; and a ring portion mechanically coupled with the stem portion and for coupling with a restraint for securing assets to the ULD pallet; wherein the anchor-ring tape node mechanically couples with the restraint and tracks the ULD pallet by wirelessly communication with a mesh network of a wireless tracking system.

In certain embodiments, the techniques described herein relate to a leashed tape node for tracking a unit load device (ULD) pallet having an anchor-slot formed around a perimeter thereof, including: an anchor portion shaped and sized to be secured within the anchor-slot; a flexible tether mechanically coupled with the anchor portion; and a rugged housing mechanically attached to the flexible tether and forming a housing that includes a wireless tracking circuit; wherein the anchor portion mechanically couples with, and is retained by, the anchor-slot and the wireless tracking circuit tracks the ULD pallet by wirelessly communication with a mesh network of a wireless tracking system.

BRIEF DESCRIPTION OF THE FIGURES

FIG. 9B is a flowchart illustrating one example method of creating a hierarchical communications network, in embodiments.

FIG. 17 is a cross-section C-C through the ULD pallet, the anchor-slot, and the anchor-slot tape node of FIG. 16A, illustrating one example radio transmission envelope from a wireless communication interface of the anchor-slot tape node, in embodiments.

FIGS. 19A and 19B are schematic diagrams illustrating example construction of an extended anchor-slot tape node, in embodiments.

DETAILED DESCRIPTION OF THE EMBODIMENTS

Figure 1:
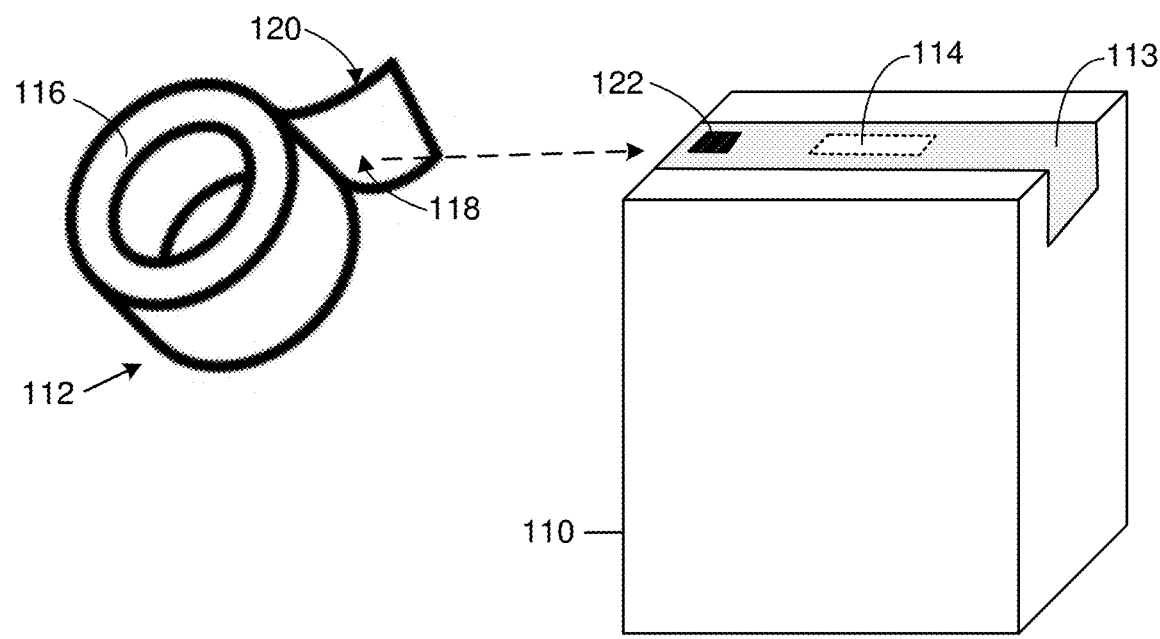
FIG. 1 is a schematic illustrating one example adhesive tape-agent platform used to seal a package for shipment, in embodiments.

FIG. 1 is a schematic illustrating one example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
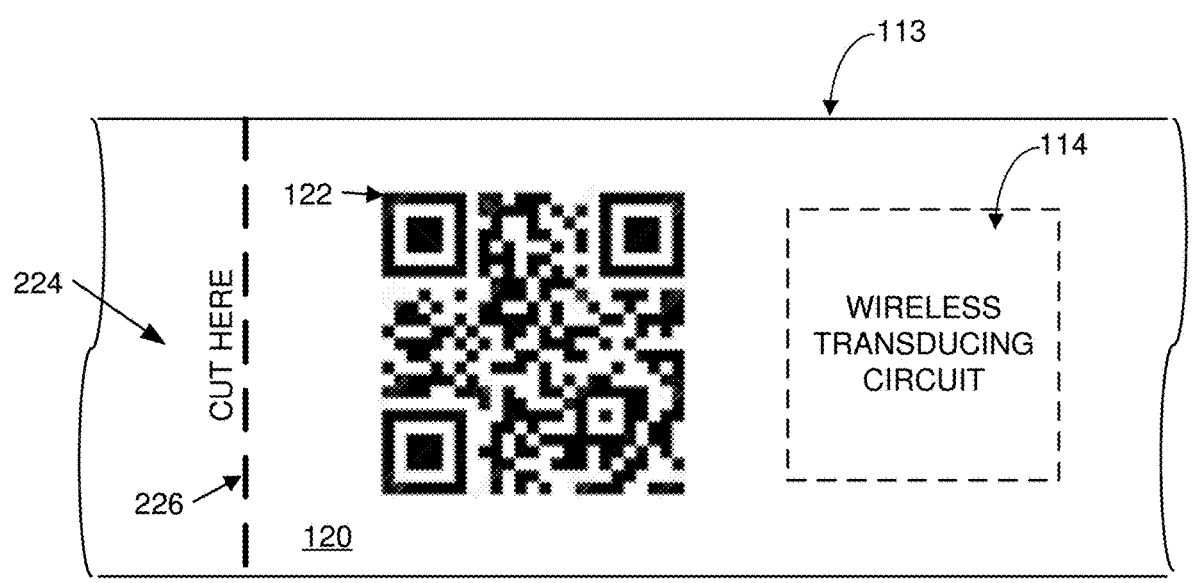
FIG. 2 is a schematic illustrating a non-adhesive surface of a segment of the adhesive tape agent platform of FIG. 1, in embodiments.

FIG. 2 is a schematic illustrating a non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 2, the segment 113 of the adhesive tape agent platform 112 includes an identifier 122 (e.g., a two-dimensional bar code, such as a QR Code), written instructions 224 (e.g., "Cut Here"), and an associated cut line 226 that indicates where the user should cut the adhesive tape agent platform 112. The written instructions 224 and the cut line 226 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 226. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 226).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
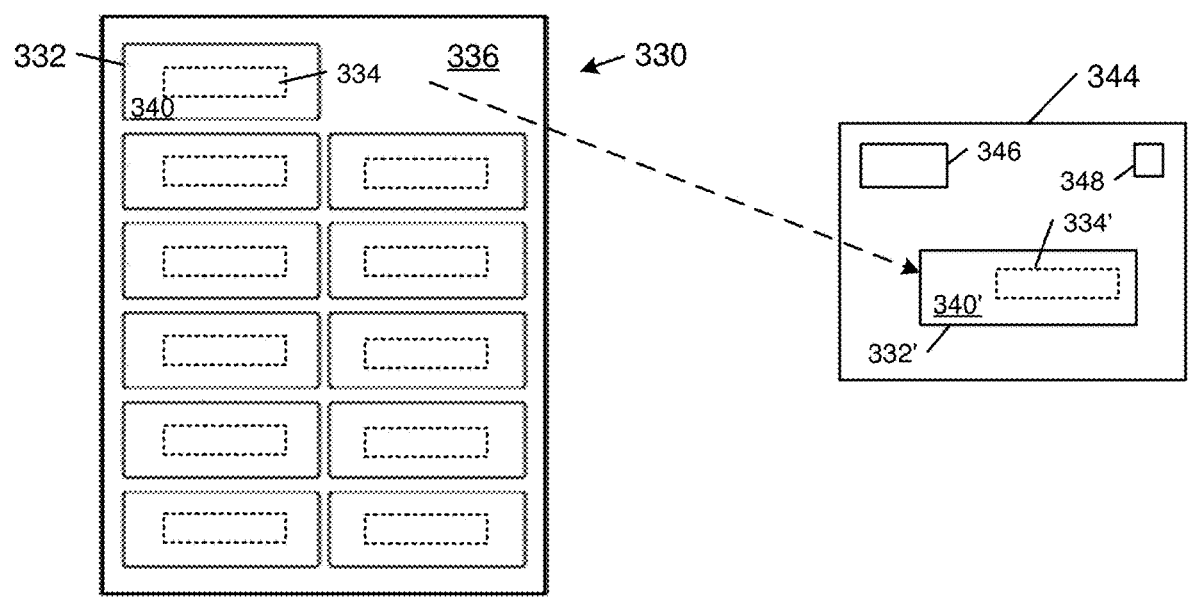
FIG. 3 shows one example adhesive tape platform that includes a set of adhesive tape platform segments on a backing sheet, in embodiments.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 of FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 344 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
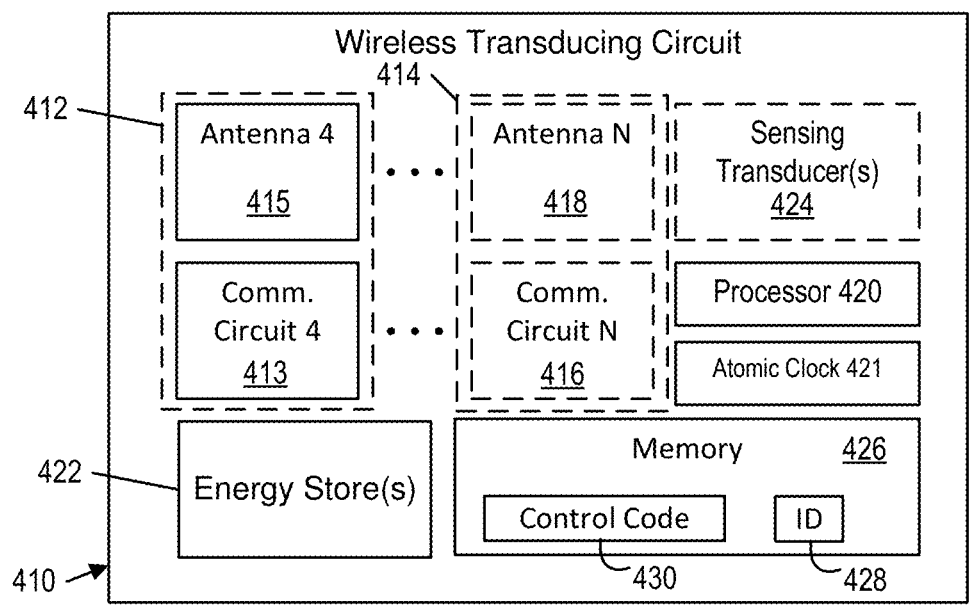
FIG. 4 is a block diagram illustrating components of an example wireless transducing circuit that includes one or more wireless communication modules, in embodiments.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a pressure sensor, a gyroscope, an accelerometer, a velocity sensor, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
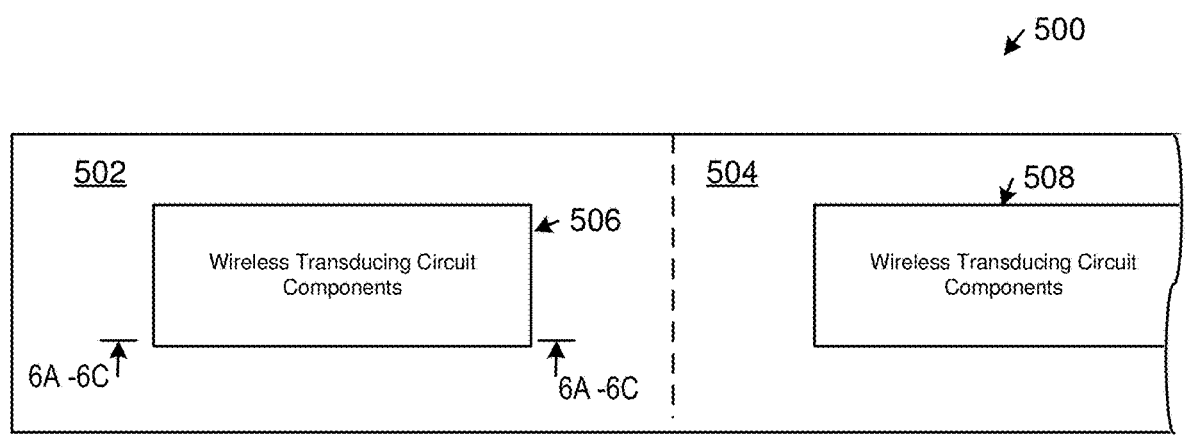
FIG. 5 is a top view of a portion of an example flexible adhesive tape platform illustrating a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 6A:
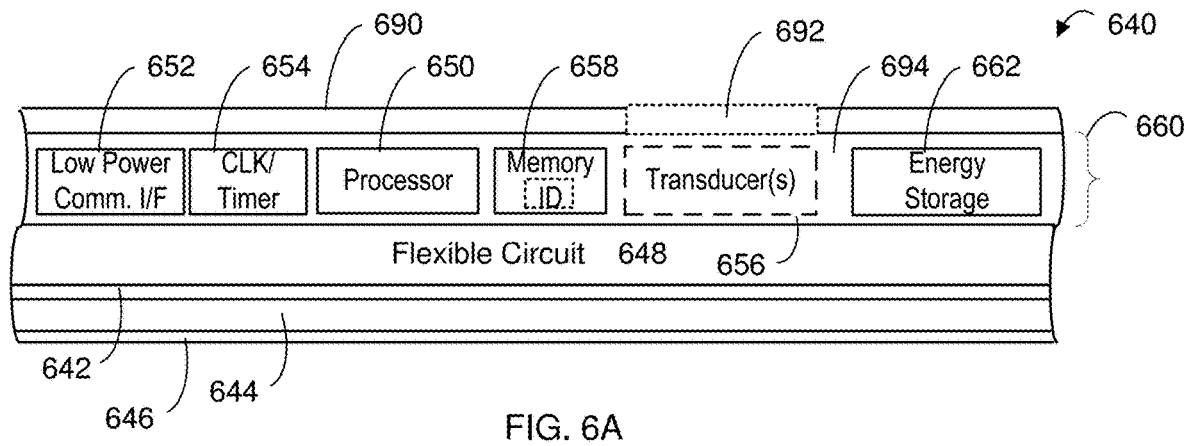
FIGS. 6A-C are schematic diagrams illustrating cross-sectional side views of portions of example segments of three types of flexible adhesive tape agent platforms, in embodiments.
Figure 6B:
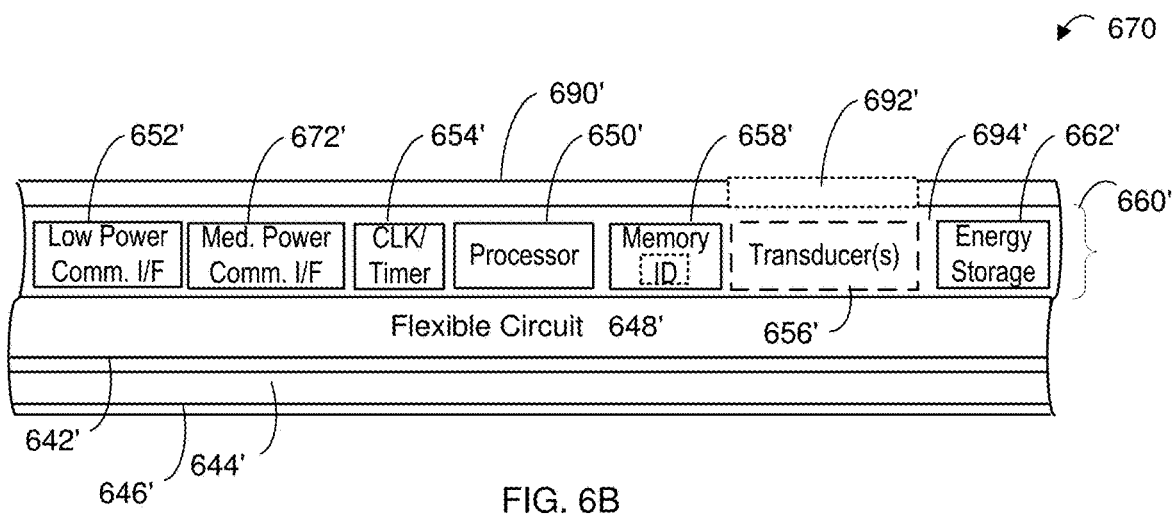
Figure 6C:
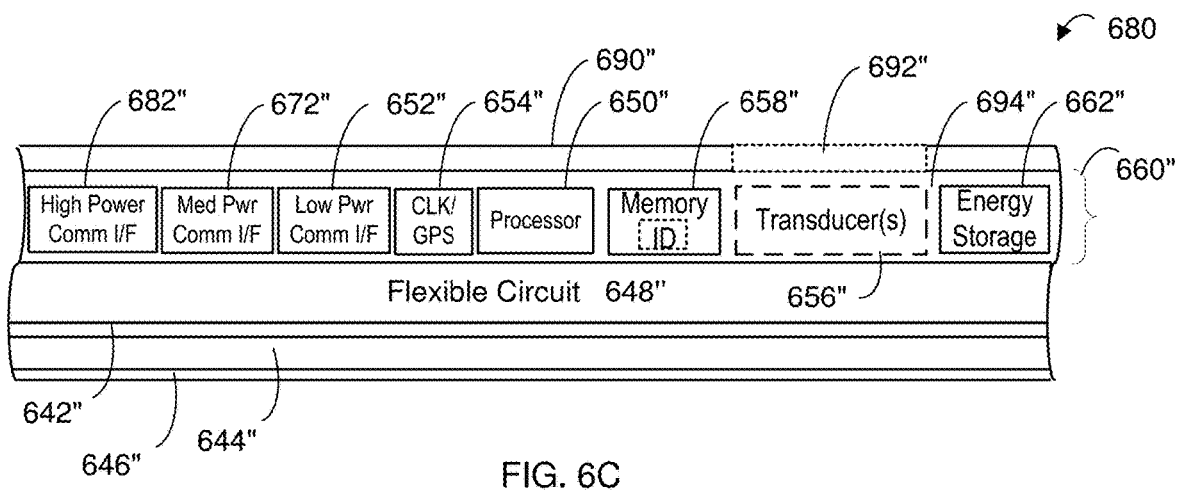
Figure 7A:
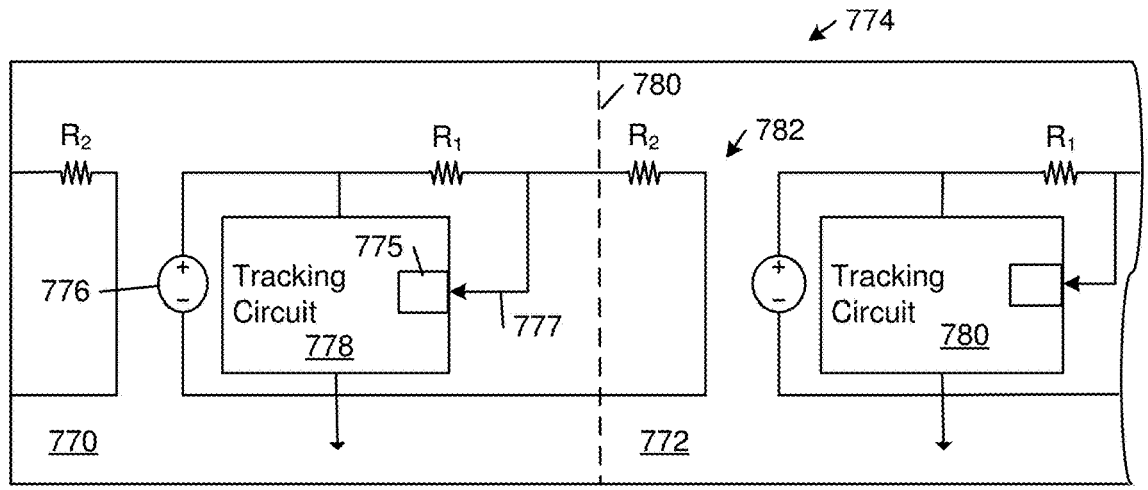
FIG. 7A is a schematic diagram illustrating an adhesive tracking product with a first example wake circuit that delivers power from an energy source to the tracking circuit in response to an event, in embodiments.
Figure 7B:
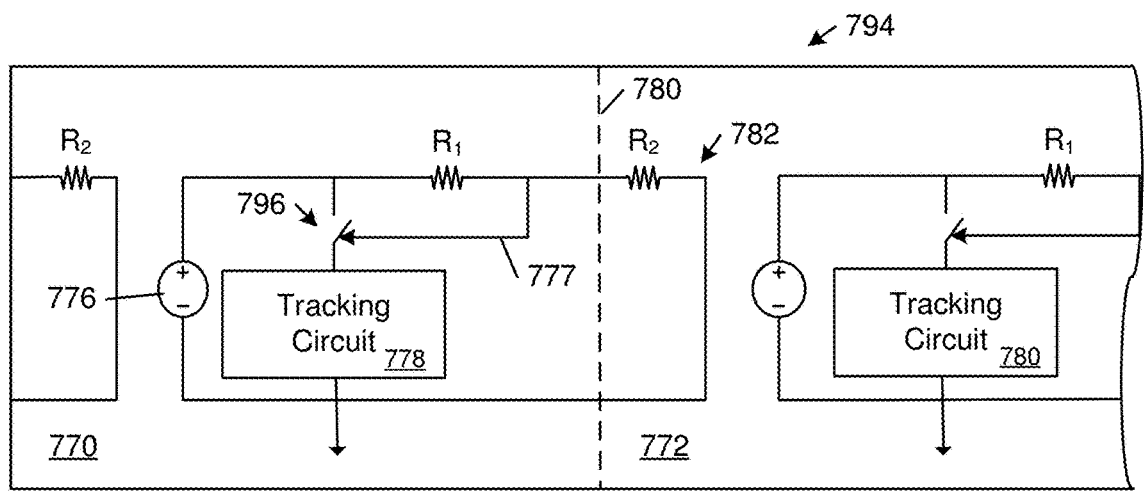
FIG. 7B is a schematic diagram illustrating an adhesive tracking product with a second example wake circuit that delivers power from an energy source to the tracking circuit in response to an event.

An example method of fabricating the adhesive tape platform 500 according to a roll-to-roll fabrication process is described in connection with FIGS. 6A-6C and as shown in FIGS. 7A and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A is a schematic illustrating a cross-sectional side view of a portion of an example segment 640 of a flexible adhesive tape agent platform (e.g., platform 500 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a pre-fabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 500 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652.

The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task. Sensor transducers 656, 656', 656" may include one or more of temperature sensor, humidity sensor, air pressure sensor, force/pressure sensor, accelerometer, gyroscope, magnetometer (6-axis motion sensor), vibration sensor, and sound sensor.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 7C:
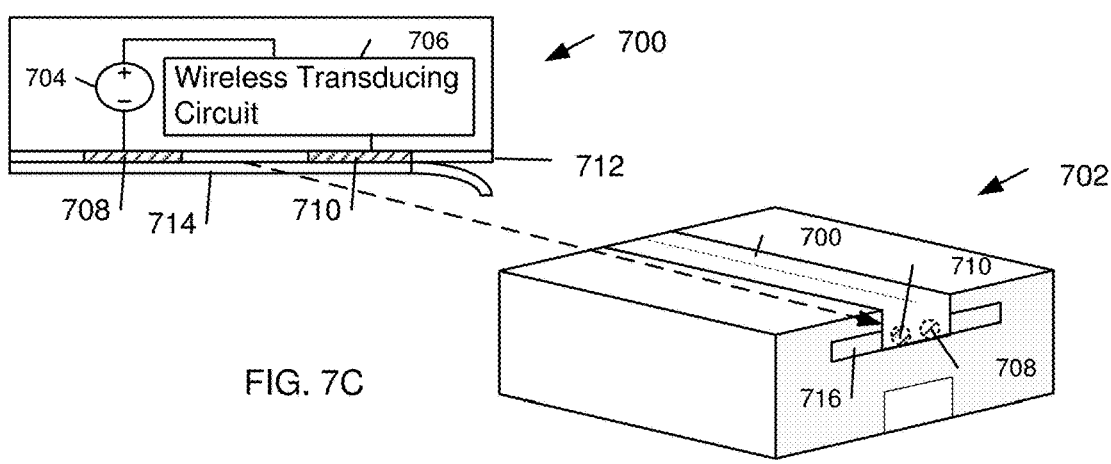
FIG. 7C is a diagrammatic cross-sectional front view of an example adhesive tape platform and a perspective view of an example asset, in embodiments.

FIG. 7C shows a diagrammatic cross-sectional front view of an example adhesive tape platform 700 and a perspective view of an example asset 702. Instead of activating the adhesive tape platform in response to separating a segment of the adhesive tape platform from a roll or a sheet of the adhesive tape platform, this example is configured to supply power from the energy source 704 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Figure 8:
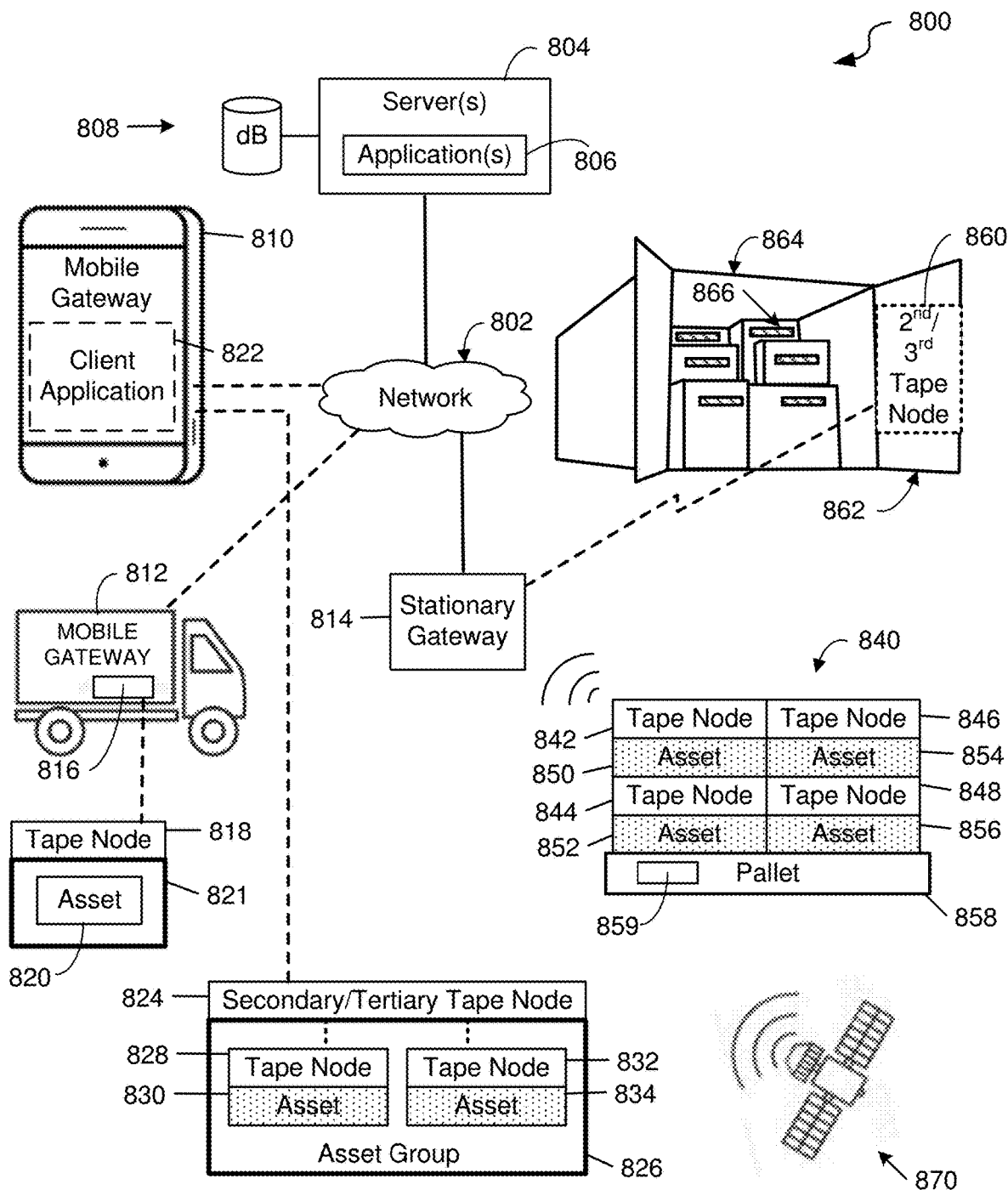
FIG. 8 is a schematic illustrating an example network communications environment that includes a network supporting communications between servers, mobile gateways, a stationary gateway, and various types of tape nodes associated with various assets, in embodiments.

FIG. 8 shows an example network communications environment 800 that includes a network 802 that supports communications between one or more servers 804 executing one or more applications of a network service 808, mobile gateways 810 (a smart device mobile gateway), 812 (a vehicle mobile gateway), a stationary gateway 814, and various types of tape nodes that are associated with various assets (e.g., parcels, equipment, tools, persons, and other things). Hereinafter "tape nodes" may be used interchangeably with the "agents", as described above, with reference to FIGS. 1-9A; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 802 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 802 includes communications infrastructure equipment, such as a geolocation satellite system 870 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 820) or other stationary (e.g., stationary gateway 814) or mobile object (e.g., a, such as a delivery truck, such as mobile gateway 812) or stationary object (e.g., a structural element of a building). This process activates the tape node (e.g., the tape node 818) and causes the tape node 818 to communicate with the one or more servers 804 of the network service 808. In this process, the tape node 818 may communicate through one or more other tape nodes (e.g., the tape nodes 842, 844, 846, 848) in the communication hierarchy. In this process, the one or more servers 804 executes the network service application 806 to programmatically configure tape nodes 818, 824, 828, 832, 842, 844, 846, 848, that are deployed in the network communications environment 800. In some examples, there are multiple classes or types of tape nodes (e.g., a master agent, a secondary agent, or a tertiary agent), where each tape node class has a different respective set of functionalities and/or capacities, as described herein with respect to the "agents" in FIGS. 1-9A. For example, the master agents have a lower-power wireless communication interface (e.g., the low-power wireless-communication interface 652, with reference to FIG. 6A), in comparison to the secondary and tertiary agents.

In some examples, the one or more servers 804 communicate over the network 802 with one or more gateways 810, 812, 814 that are configured to send, transmit, forward, or relay messages to the network 802 in response to transmissions from the tape nodes 818, 824, 828, 832, 842, 844, 846, 848 that are associated with respective assets and within communication range. Example gateways include mobile gateways 810, 812 and a stationary gateway 814. In some examples, the mobile gateways 810, 812, and the stationary gateway 814 are able to communicate with the network 802 and with designated sets or groups of tape nodes.

In some examples, the mobile gateway 812 is a vehicle (e.g., a delivery truck or other mobile hub) that includes a wireless communications unit 816 that is configured by the network service 808 to communicate with a designated network of tape nodes, including tape node 818 (e.g., a master tape node) in the form of a label that is adhered to a parcel 821 (e.g., an envelope) that contains an asset 820, and is further configured to communicate with the network service 808 over the network 802. In some examples, the tape node 818 includes a lower-power wireless-communications interface of the type used in, e.g., segment 640 (shown in FIG. 6A), and the wireless communications unit 816 may be implemented by a secondary or tertiary tape node (e.g., one of segment 670 or segment 680, respectively shown in FIGS. 6B and 6C) that includes a lower-power communications interfaces for communicating with tape nodes within range of the mobile gateway 812 and a higher-power communications-interface for communicating with the network 802. In this way, the tape node 818 and wireless communications unit 816 create a hierarchical wireless network of tape nodes for transmitting, forwarding, bridging, relaying, or otherwise communicating wireless messages to, between, or on behalf of the tape node 818 in a power-efficient and cost-effective way.

In some examples, a mobile gateway 810 is a mobile phone that is operated by a human operator and executes a client application 822 that is configured by a network service to communicate with a designated set of tape nodes, including a secondary or tertiary tape node 824 that is adhered to a parcel 826 (e.g., a box), and is further configured to communicate with a server 804 over the network 802. In the illustrated example, the parcel 826 contains a first parcel labeled or sealed by a master tape node 828 and containing a first asset 830, and a second parcel labeled or sealed by a master tape node 832 and containing a second asset 834. The secondary or tertiary tape node 824 communicates with each of the master tape nodes 828, 832 and also communicates with the mobile gateway 810. In some examples, each of the master tape nodes 828, 832 includes a lower-power wireless-communications interface of the type used in, e.g., segment 640 (shown in FIG. 6A), and the secondary/tertiary tape node 824 is implemented by a tape node (e.g., segment 670 or segment 680, shown in FIGS. 6B and 6C) that includes a low-power communications interface for communicating with the master tape nodes 828, 832 contained within the parcel 826, and a higher-power communications interface for communicating with the mobile gateway 810. The secondary or tertiary tape node 824 is operable to relay wireless communications between the master tape nodes 828, 832 contained within the parcel 826 and the mobile gateway 810, and the mobile gateway 810 is operable to relay wireless communications between the secondary or tertiary tape node 824 and the server 804 over the network 802. In this way, the master tape nodes 828 and 832 and the secondary or tertiary tape node 824 create a wireless network of nodes for transmitting, forwarding, relaying, or otherwise communicating wireless messages to, between, or on behalf of the master tape nodes 828, 832, the secondary or tertiary tape node 824, and the network service (not shown) in a power-efficient and cost-effective way.

In some embodiments, the client application 822 is installed on a mobile device (e.g., smartphone) that may also operate as mobile gateway 810. The client application 822 may cause the mobile device to function as a mobile gateway 810. For example, the client application 822 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 822) relays that data to the server 804 via cellular (2G, 3G, 4G, 5G) or Wi-Fi. Further, the client application 822 may cause the mobile device to establish a connection with, and receive pings (e.g., alerts to nearby assets that an environmental profile threshold has been exceeded), from the tape nodes or from the server 804. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 822 may share location data with the tape node, allowing the tape node to pinpoint its location.

In some examples, the stationary gateway 814 is implemented by a server 804 executing a network service application 806 that is configured by the network service 808 to communicate with a designated set 840 of master tape nodes 842, 844, 846, 848 that are adhered to respective parcels containing respective assets 850, 852, 854, 856 on a pallet 858. In other examples, the stationary gateway 814 is implemented by a secondary or tertiary tape node 860 (e.g., segments 670 or 680, respectively shown in FIGS. 6B and 6C) that is adhered to, for example, a wall, column or other infrastructure component of the physical premise's environment 800, and includes a low-power communications interface for communicating with nodes within range of the stationary gateway 814 and a higher-power communications interface for communicating with the network 802.

In one embodiment, each of the master tape nodes 842-848 is a master tape node and is configured by the network service 808 to communicate individually with the stationary gateway 814, which relays communications from the master tape nodes 842-848 to the network service 808 through the stationary gateway 814 and over the network 802. In another embodiment, one of the master tape nodes 842-848 at a time is configured to transmit, forward, relay, or otherwise communicate wireless messages to, between, or on behalf of the other master nodes on the pallet 858. In this embodiment, the master tape node may be determined by the master tape nodes 842-848 or designated by the network service 808. In some examples, the master tape nodes 842-848 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 859 is adhered to the pallet 858 and is configured to perform the role of a master node for the other master tape nodes 842-848. In these ways, the master tape nodes 842-848, 859 are configurable to create different wireless networks of nodes for transmitting, forwarding, relaying, bridging, or otherwise communicating wireless messages with the network service 808 through the stationary gateway 814 and over the network 802 in a power-efficient and cost-effective way.

In the illustrated example, the stationary gateway 814 also is configured by the network service 808 to communicate with a designated network of tape nodes, including the secondary or tertiary tape node 860 that is adhered to the inside of a door 862 of a shipping container 864, and is further configured to communicate with the network service 808 over the network 802. In the illustrated example, the shipping container 864 contains a number of parcels labeled or sealed by respective master tape nodes 866 and containing respective assets. The secondary or tertiary tape node 860 communicates with each of the master tape nodes 866 within the shipping container 864 and communicates with the stationary gateway 814. In some examples, each of the master tape nodes 866 includes a low-power wireless communications-interface (e.g., the low-power wireless communication interface 652, 652', 652", with reference to FIGS. 6A-6C), and the secondary or tertiary tape node 860 includes a low-power wireless communications interface (low-power wireless communication interfaces 652', 652", with reference to FIGS. 6B-6C) for communicating with the master tape nodes 866 contained within the shipping container 864, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 814. In some examples, either a secondary or tertiary tape node, or both, may be used, depending on whether a high-power wireless-communication interface is necessary for sufficient communication.

In some examples, when the doors of the shipping container 864 are closed, the secondary or tertiary tape node 860 is operable to communicate wirelessly with the master tape nodes 866 contained within the shipping container 864. In some embodiments, both a secondary and a tertiary node are attached to the shipping container 864. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 860 is configured to collect sensor data from master tape nodes 866 and, in some embodiments, process the collected data to generate, for example, statistics from the collected data. When the doors of the shipping container 864 are open, the secondary or tertiary tape node 860 is programmed to detect the door opening (e.g., using a photodetector or an accelerometer component of the secondary or tertiary tape node 860) and, in addition to reporting the door opening event to the network service 808, the secondary or tertiary tape node 860 is further programmed to transmit the collected data and/or the processed data in one or more wireless messages to the stationary gateway 814. The stationary gateway 814, in turn, is operable to transmit the wireless messages received from the secondary or tertiary tape node 860 to the network service 808 over the network 802. Alternatively, in some examples, the stationary gateway 814 also is operable to perform operations on the data received from the secondary or tertiary tape node 860 with the same type of data produced by the secondary or tertiary tape node 860 based on sensor data collected from the master tape nodes 842-848. In this way, the secondary or tertiary tape node 860 and master tape node 866 create a wireless network of nodes for transmitting, forwarding, relaying, or otherwise communicating wireless messages to, between, or on behalf of the master tape node 866, the secondary or tertiary tape nodes 860, and the network service 808 in a power-efficient and cost-effective way.

In an example of the embodiment shown in FIG. 8, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-9A). The short-range master tape nodes typically are adhered directly to parcels containing assets. In the illustrated example, the master tape nodes 818, 828, 832, 842-848, 866 are short-range tape nodes. The short-range tape nodes typically communicate with a low-power wireless-communication protocol (e.g., Bluetooth LE, Zigbee, or Z-wave). The segments 670 are typically adhered to objects (e.g., a parcel 826 and a shipping container 864) that are associated with multiple parcels that are separated from the medium-range tape nodes by a barrier or a long distance. In the illustrated example, the secondary and/or tertiary tape nodes 824 and 860 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 800.

In the illustrated example, the mobile gateway 812 and the stationary gateway 814 are implemented by, e.g., segment 680. The segments 680 typically communicate with other nodes using a high-power wireless-communication protocol (e.g., a cellular data communication protocol). In some examples, the wireless communications circuit h (a secondary or tertiary tape node) is adhered to a mobile gateway 812 (e.g., a truck). In these examples, the wireless communications unit 816 may be moved to different locations in the network communications environment 800 to assist in connecting other tape nodes to the wireless communications unit 816. In some examples, the stationary gateway 814 is a tape node that may be attached to a stationary structure (e.g., a wall) in the network communications environment 800 with a known geographic location (e.g., GPS coordinates). In these examples, other tape nodes in the environment may determine their geographic location by querying the stationary gateway 814.

In some examples, in order to conserve power, the tape nodes typically communicate according to a schedule promulgated by the network service 808. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 804, either directly or indirectly through a gateway tape node (e.g., the long-range tape node, such as wireless communication unit 816, adhered to the mobile gateway 812, or a long-range tape node, such as stationary gateway 814, that is adhered to an infrastructure component of the network communications environment 800). In other examples, the master tape node processes the information contained in the received data packets and transmits the processed information to the server 804.

Figure 9A:
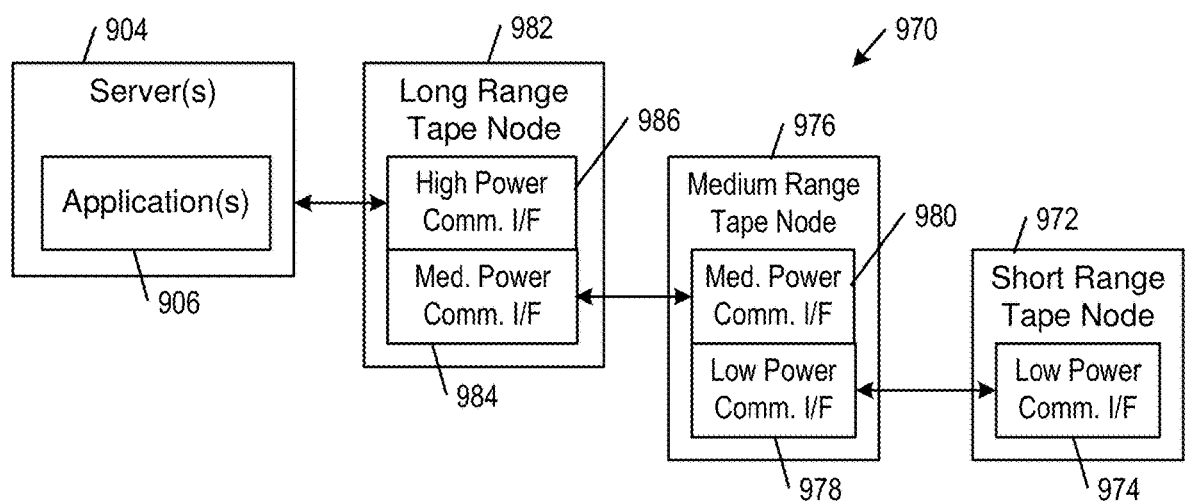
FIG. 9A is a schematic illustrating one example hierarchical wireless communications network of tape nodes, in embodiments.

FIG. 9A is a schematic illustrating one example hierarchical wireless communications network of tape nodes 970. In this example, the short-range tape node 972 and the medium range tape node 976 communicate with one another over their respective low power wireless communication interfaces 974, 978. The medium range tape node 976 and the long-range tape node 982 communicate with one another over their respective medium power wireless communication interfaces 980, 984. The long-range tape node 982 and the one or more network service servers 904 (e.g., server(s) 804, FIG. 8) running application(s) 906 (e.g., application(s) 806) communicate with one another over the high-power communication interface 986. In some examples, the low power communication interfaces 974, 978 establish wireless communications with one another in accordance with the Bluetooth LE protocol, the medium power communication interfaces 980, 984 establish wireless communications with one another in accordance with the LoRa communications protocol, and the high-power communication interface 986 establishes wireless communications with the one or more network service servers 904 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 904 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 904. The schedule usually dictates all aspects of the communication, including the times when particular tape nodes should communicate, the mode of communication, and the contents of the communication. In one example, the one or more network service servers 904 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 904, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the environment 800). In other examples, the master tape node processes the information contained in the received data packets and transmits the processed information to the one or more network service servers 904/804.

FIG. 9B is a flowchart illustrating one example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 9B, block 990). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 9B, block 992). An application executing on a computer system (e.g., the one or more network service servers 904 of network service 808) establishes a wireless communication connection with the second type of wireless communication interface of the first tape node, and the application transmits programmatic code executable by the first tape node to function as a master tape node with respect to the second tape node (FIG. 9B, block 994).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 10A:
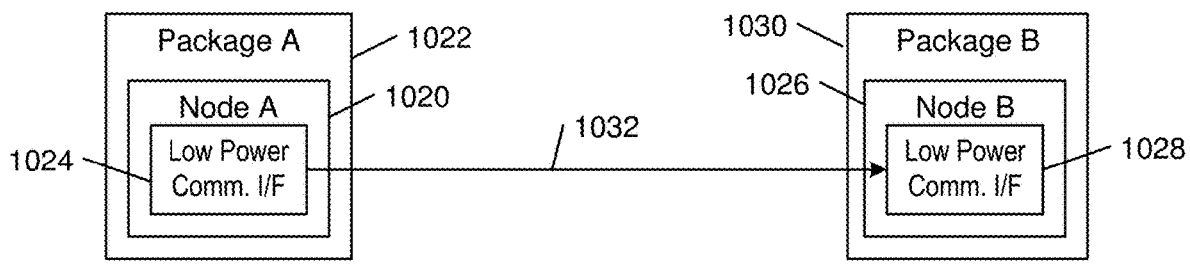
FIG. 10A shows a node (Node A) associated with a package (Package A), in embodiments.

Referring to FIG. 10A, a node 1020 (Node A) is associated with a package 1022 (Package A). In some embodiments, the node 1020 may be implemented as a tape node that is used to seal the package 1022 or it may be implemented as a label node that is used to label the package 1022; alternatively, the node 1020 may be implemented as a non-tape node that is inserted within the package 1022 or embedded in or otherwise attached to the interior or exterior of the package 1022. In the illustrated embodiment, the node 1020 includes a low power communications interface 1024 (e.g., a Bluetooth Low Energy communications interface). Another node 1026 (Node B), which is associated with another package 1030 (Package B), is similarly equipped with a compatible low power communications interface 1028 (e.g., a Bluetooth Low Energy communications interface).

In an example scenario, in accordance with the programmatic code stored in its memory, node 1026 (Node B) requires a connection to node 1020 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1020 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1032 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
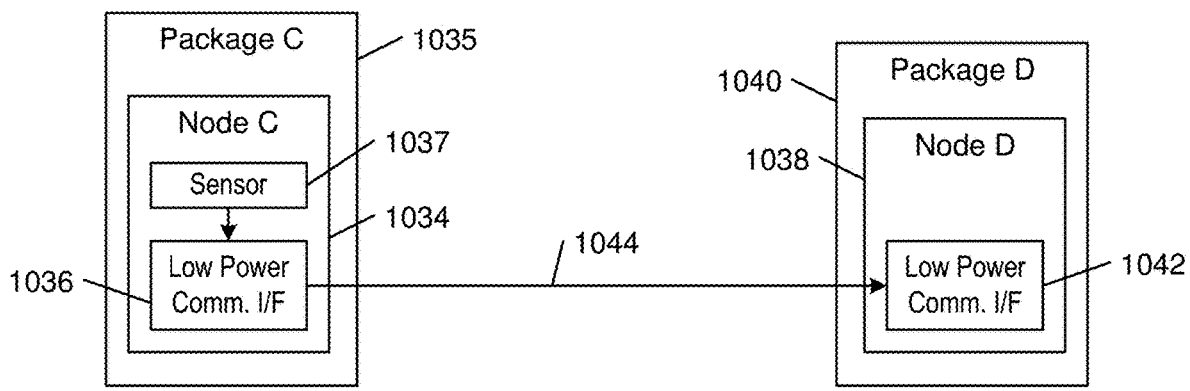
FIG. 10B shows a node (Node C) associated with a package (Package C), in embodiments.

Referring to FIG. 10B, a node 1034 (Node C) is associated with a package 1035 (Package C). In the illustrated embodiment, the Node C includes a low power communications interface 1036 (e.g., a Bluetooth Low Energy communications interface), and a sensor 1037 (e.g., a temperature sensor). Another node 1038 (Node D), which is associated with another package 1040 (Package D), is similarly equipped with a compatible low power communications interface 1042 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1044 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
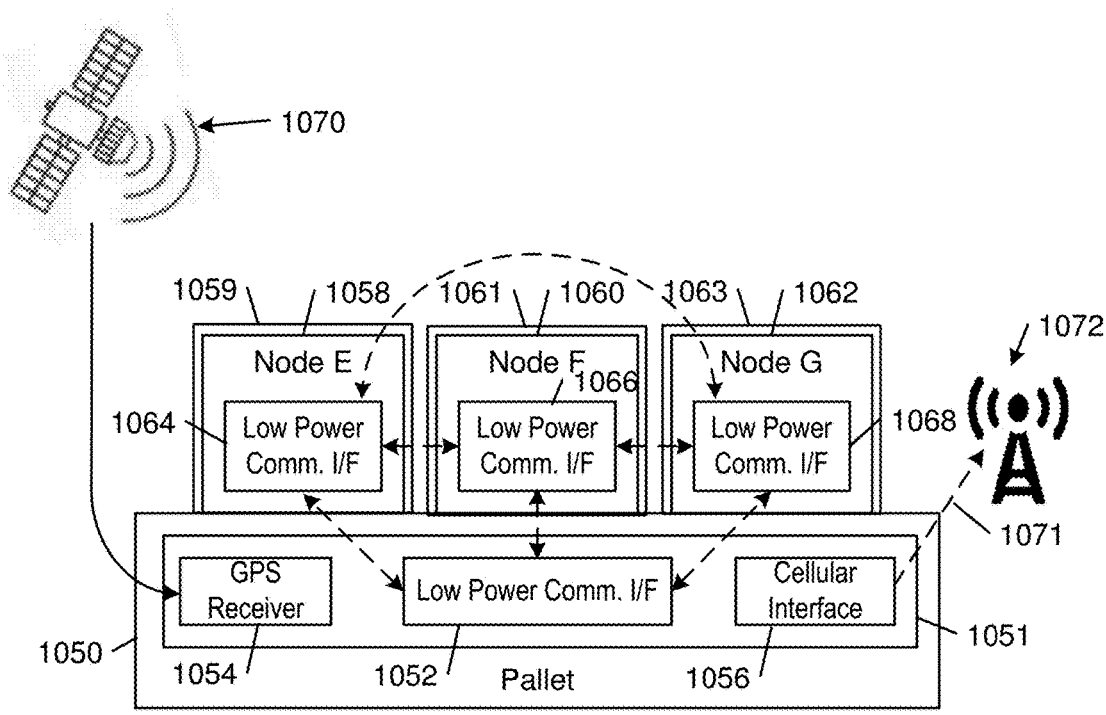
FIG. 10C shows a pallet associated with a master node that includes a low-power communications interface, a GPS receiver, and a cellular communications interface, in embodiments.

Referring to FIG. 10C, a pallet 1050 is associated with a master node 1051 that includes a low-power communications interface 1052, a GPS receiver 1054, and a cellular communications interface 1056. In some embodiments, the master node 1051 may be implemented as a tape node or a label node that is adhered to the pallet 1050. In other embodiments, the master node 1051 may be implemented as a non-tape node that is inserted within the body of the pallet 1050 or embedded in or otherwise attached to the interior or exterior of the pallet 1050.

The pallet 1050 provides a structure for grouping and containing packages 1059, 1061, 1063 each of which is associated with a respective peripheral node 1058, 1060, 1062 (Node E, Node F, and Node G). Each of the peripheral nodes 1058, 1060, 1062 includes a respective low power communications interface 1064, 1066, 1068 (e.g., Bluetooth Low Energy communications interface). In the illustrated embodiment, each of the nodes E, F, G, and the master node 1051 are connected to each of the other nodes over a respective low power communications path (shown by dashed lines).

In some embodiments, the packages 1059, 1061, 1063 are grouped together because they are related. For example, the packages 1059, 1061, 1063 may share the same shipping itinerary or a portion thereof. In an example scenario, the master pallet node 1051 scans for advertising packets that are broadcasted from the peripheral nodes 1058, 1060, 1062. In some examples, the peripheral nodes broadcast advertising packets during respective scheduled broadcast intervals. The master node 1051 can determine the presence of the packages 1059, 1061, 1063 in the vicinity of the pallet 1050 based on receipt of one or more advertising packets from each of the nodes E, F, and G. In some embodiments, in response to receipt of advertising packets broadcasted by the peripheral nodes 1058, 1060, 1062, the master node 1051 transmits respective requests to the server to associate the master node 1051 and the respective peripheral nodes 1058, 1060, 1062. In some examples, the master tape node requests authorization from the server to associate the master tape node and the peripheral tape nodes. If the corresponding packages 1059, 1061, 1063 are intended to be grouped together (e.g., they share the same itinerary or certain segments of the same itinerary), the server authorizes the master node 1051 to associate the peripheral nodes 1058, 1060, 1062 with one another as a grouped set of packages.

In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1051 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1058, 1060, 1062 include environmental sensors for obtaining information regarding environmental conditions in the vicinity of the associated packages 1059, 1061, 1063. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1051 can determine its own location based on geolocation data transmitted by a satellite-based radio navigation system 1070 (e.g., GPS, GLONASS, and NAVSTAR) and received by the GPS receiver 1054 component of the master node 1051. In an alternative embodiment, the location of the master pallet node 1051 can be determined using cellular based navigation techniques that use mobile communication technologies (e.g., GSM, GPRS, CDMA, etc.) to implement one or more cell-based localization techniques. After the master node 1051 has ascertained its location, the distance of each of the packages 1059, 1061, 1063 from the master node 1051 can be estimated based on the average signal strength of the advertising packets that the master node 1051 receives from the respective peripheral node. The master node 1051 can then transmit its own location and the locations of the package nodes E, F, and G to a server over a cellular interface connection with a cellular network 1072. Other methods of determining the distance of each of the packages 1059, 1061, 1063 from the master node 1051, such as Received Signal-Strength Index (RSSI) based indoor localization techniques, also may be used.

In some embodiments, after determining its own location and the locations of the peripheral nodes, the master node 1051 reports the location data and the collected and optionally processed (e.g., either by the peripheral nodes peripheral nodes 1058, 1060, 1062 or the master node 1051) sensor data to a server over a cellular communication path 1071 on a cellular network 1072.

In some examples, nodes are able to autonomously detect logistics execution errors if packages that are supposed to travel together no longer travel together and raise an alert. For example, a node (e.g., the master node 1051 or one of the peripheral nodes 1058, 1060, 1062) alerts the server when the node determines that a particular package 1059 is being or has already been improperly separated from the group of packages. The node may determine that there has been an improper separation of the particular package 1059 in a variety of ways. For example, the associated peripheral node 1058 that is bound to the particular package 1059 may include an accelerometer that generates a signal in response to movement of the package from the pallet. In accordance with its intelligent agent program code, the associated peripheral node 1058 determines that the master node 1051 has not disassociated the particular package 1059 from the group and therefore broadcasts advertising packets to the master node, which causes the master node 1051 to monitor the average signal strength of the advertising packets and, if the master node 1051 determines that the signal strength is decreasing over time, the master node 1051 will issue an alert either locally (e.g., through a speaker component of the master node 1051) or to the server.

Figure 11:
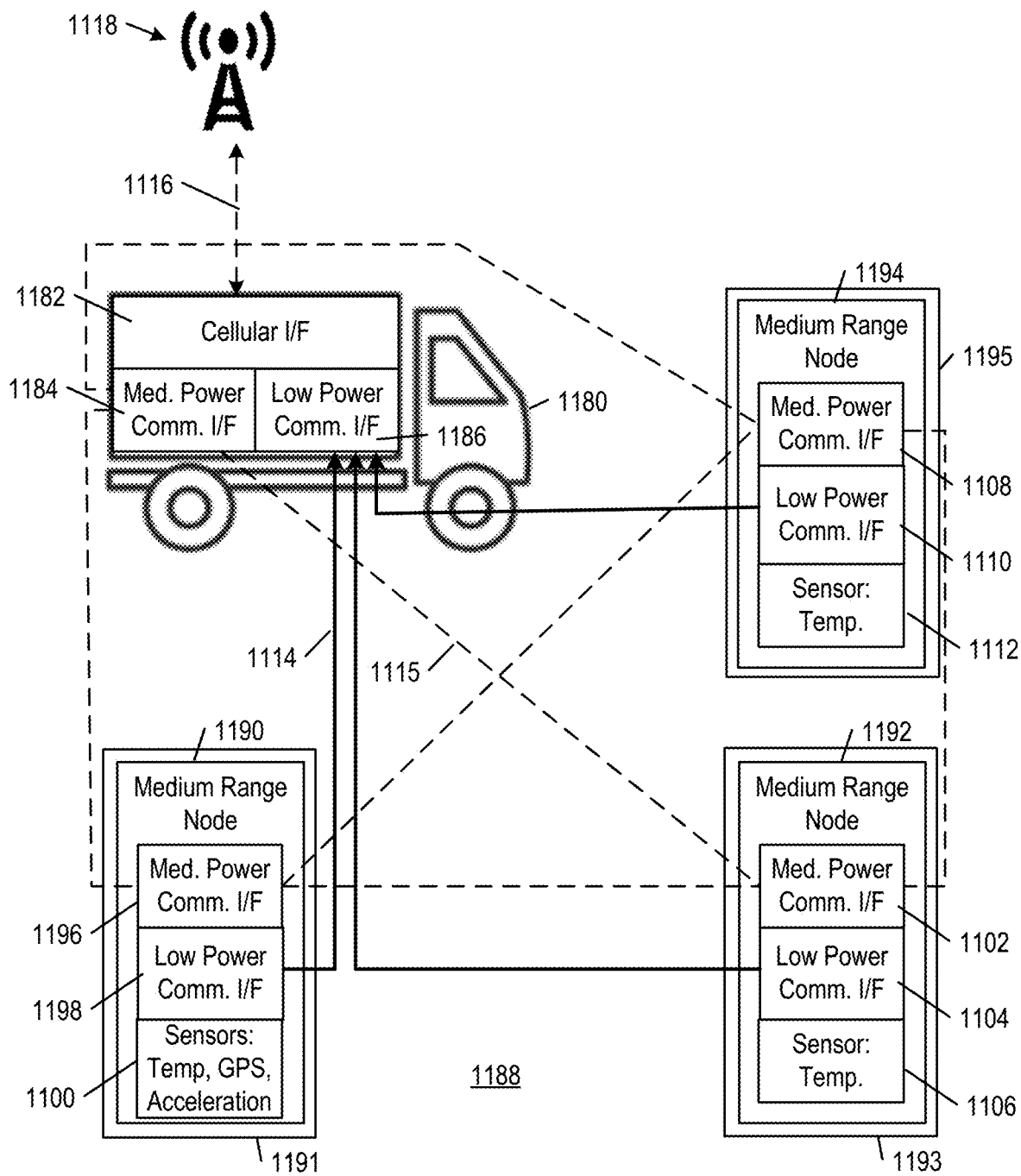
FIG. 11 is a schematic illustrating a truck configured as a mobile node, or mobile hub, with a cellular communications interface, a medium-power communications interface, and a low power communications interface, in embodiments.

FIG. 11 is a schematic illustrating a truck 1180 configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1194 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1115), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 12:
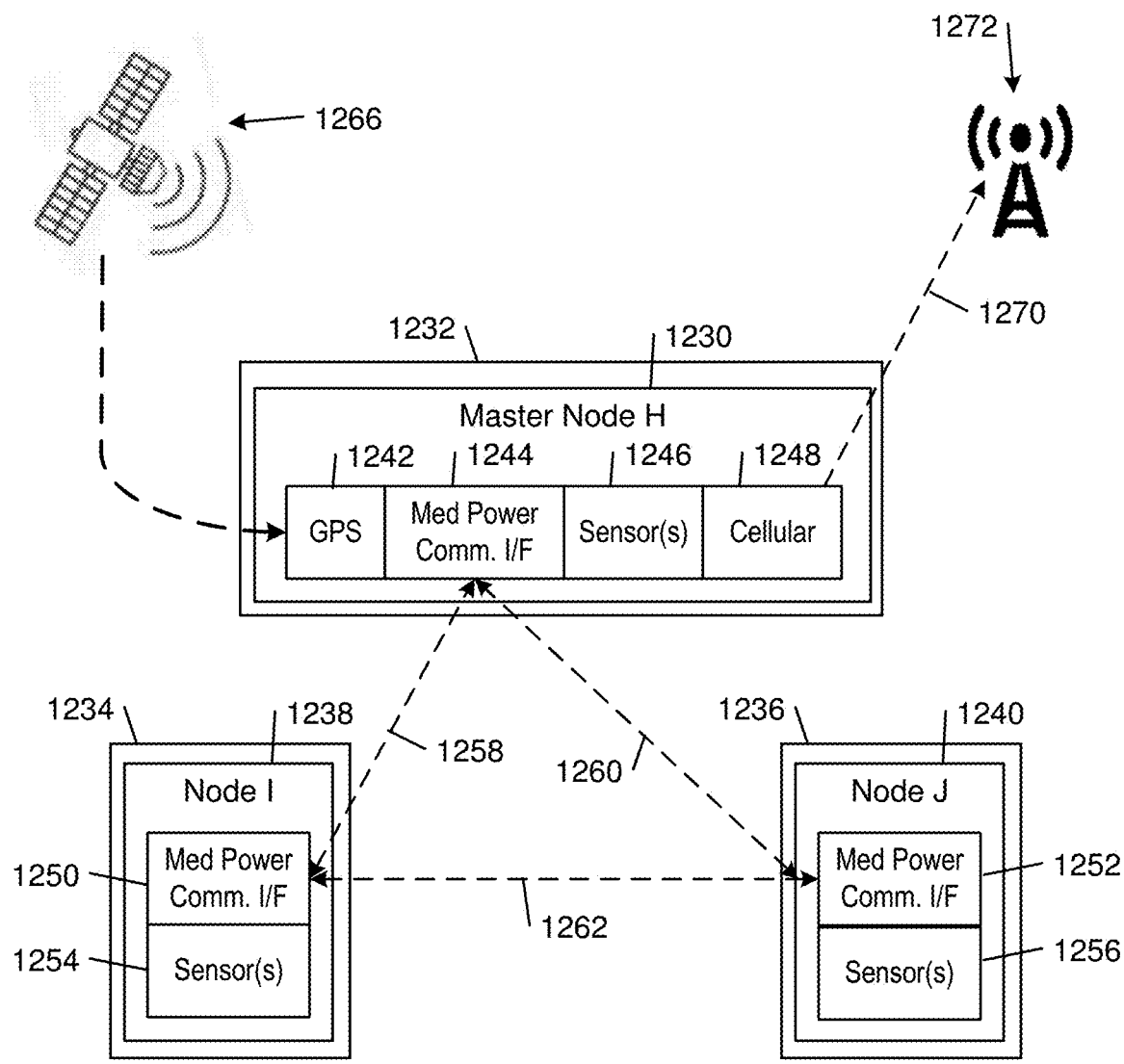
FIG. 12 is a schematic illustrating a master node associated with a logistic item that is grouped together with other logistic items associated with peripheral nodes, in embodiments.

FIG. 12 is a schematic illustrating a master node 1230 is associated with a logistic item 1232 (e.g., a package) and grouped together with other logistic items 1234, 1236 (e.g., packages) that are associated with respective peripheral nodes 1238, 1240. The master node 1230 includes a GPS receiver 1242, a medium power communications interface 1244, one or more sensors 1246, and a cellular communications interface 1248. Each of the peripheral nodes 1238, 1240 includes a respective medium power communications interface 1250, 1252 and one or more respective sensors 1254, 1256. In the illustrated embodiment, the peripheral and master nodes are connected to one another other over respective pairwise communications paths (shown by dashed lines). In some embodiments, the nodes 1230, 1238, 1240 communicate through respective LoRa communications interfaces over LoRa formatted communications paths 1258, 1260, 1262.

In the illustrated embodiment, the master and peripheral nodes 1230, 1238, 1240 include environmental sensors for obtaining information regarding environmental conditions in the vicinity of the associated logistic items 1232, 1234, 1236. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1230 periodically broadcasts advertising packets in the surrounding area. When the peripheral nodes 1238, 1240 are within range of master node 1230, and are operating in a listening mode, the peripheral nodes 1238, 1240 will extract the address of master node 1230 and potentially other information (e.g., security information) from the advertising packets. If, according to their respective programmatic code, the peripheral nodes 1238, 1240 determine that they are authorized to connect to the master node 1230, the peripheral nodes 1238, 1240 will attempt to pair with the master node 1230. In this process, the peripheral nodes 1238, 1240 and the master node 1230 determine each other's identities, capabilities, and services. For example, after successfully establishing a respective communication path 1258, 1260 with each of the peripheral nodes 1238, 1240 (e.g., a LoRa formatted communication path), the master node 1230 determines certain information about the peripheral nodes 1238, 1240, such as their identity information (e.g., peripheral nodes), their capabilities (e.g., measuring temperature data), and their services include transmitting temperature data to other nodes.

After establishing LoRa formatted communications paths 1258, 1260 with the peripheral nodes 1238, 1240, the master node 1230 transmits requests for the peripheral nodes 1238, 1240 to transmit their measured and/or locally processed temperature data to the master node 1230.

In the illustrated embodiment, the master node 1230 can determine its own location based on geolocation data transmitted by a satellite-based radio navigation system 1266 (e.g., GPS, GLONASS, and NAVSTAR) and received by the GPS receiver 1242 component of the master node 1230. In an alternative embodiment, the location of the master node 1230 can be determined using cellular based navigation techniques that use mobile communication technologies (e.g., GSM, GPRS, CDMA, etc.) to implement one or more cell-based localization techniques. After the master node 1230 has ascertained its location, the distance of each of the logistic items 1234, 1236 from the master node 1230 can be estimated based on the average signal strength of the advertising packets that the master node 1230 receives from the respective peripheral node. The master node 1230 can then transmit its own location and the locations of the package nodes H, J, and I to a server over a cellular interface connection with a cellular network 1272. Other methods of determining the distance of each of the logistic items 1234, 1236 from the master node 1230, such as Received Signal-Strength Index (RSSI) based indoor localization techniques, also may be used.

In some embodiments, after determining its own location and the locations of the peripheral nodes, the master node 1230 reports the location data, the collected and optionally processed (e.g., either by the peripheral nodes peripheral nodes 1238, 1240 or the master node 1230) sensor data to a server over a cellular communication path 1270 on a cellular network 1272.

Universal Loading Device Pallet Tracking

A unit load device (ULD) is a carrier type of device that facilitates loading of assets onto a transportation vehicle. There are two types of ULD: a pallet and a container. The pallet is used in the following examples and presents constraints on positioning of tracking devices. A ULD pallet is a flat sheet, a single-layer or a double-layer, made of aluminum for example, on which cargo (e.g., an asset, a group of assets, etc.) is secured for transport. Additional specifications or requirements of the ULD pallet may be presented by a carrier of the pallet and cargo. The ULD pallet is lightweight, as compared to ULD containers, thereby reducing labor requirements for movement of the cargo. Moreover, the ULD pallet has a relatively low cost as compared to a ULD container for example. A bottom surface of the ULD pallet contacts a surface that supports it, and therefore cannot a tracking device cannot be attached there. The assets 1304 are placed on the top surface of the ULD pallet, and thus any tracking devices attached to the top surface would be prone to damage during use of the ULD pallet and when the ULD pallets are stacked during periods of non-use. A tracking device attached to an edge of the ULD pallet is prone to damage when the ULD pallet is moved since it is unprotected. Thus, attaching a tracking device to the ULD pallet where it is less likely to be damaged is difficult. The present embodiments solve this problem by positioning the tracking device into an anchor-slot of the ULD pallet such that it is better protected from physical damage. However, the anchor-slot is relatively small and imparts significant constraints on the tracking device as detailed herein.

Figure 13:
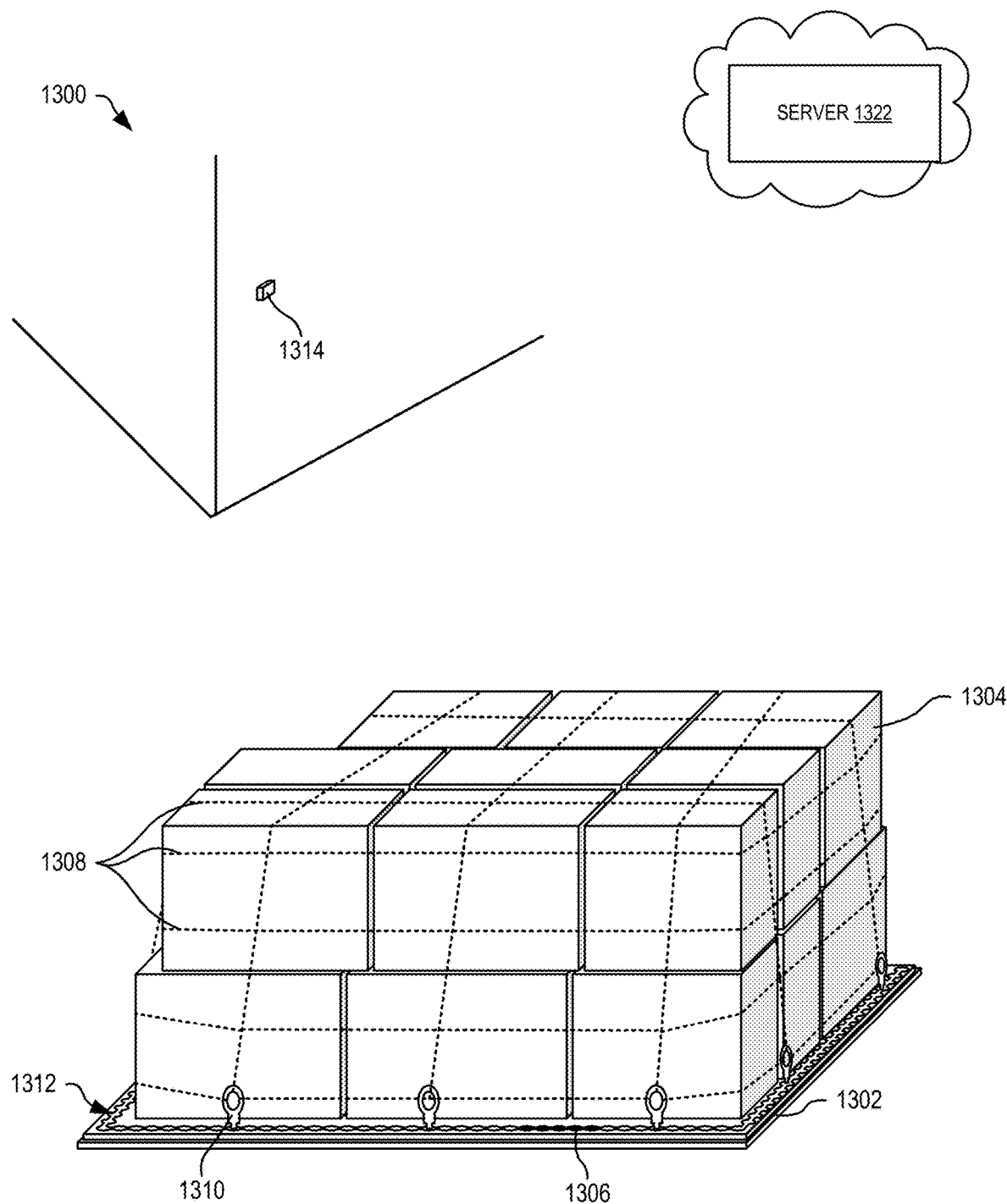
FIG. 13 is a schematic illustrating one example ULD pallet tracked by an anchor-slot tape node and loaded with a plurality of assets, in embodiments.

FIG. 13 is a schematic illustrating one example ULD pallet 1302 tracked by an anchor-slot tape node 1306 and loaded with a plurality of assets 1304, in embodiments. Assets 1304 are secured to ULD pallet 1302 by a net 1308 (or straps, or any other type of fastening mechanism) that couples with anchor rings 1310 secured within an anchor-slot 1312 of ULD pallet 1302. Anchor-slot 1312 is a recessed track formed at and around an outer perimeter of a top surface of ULD pallet 1302.

Anchor-slot 1312 allows anchor rings 1310 (and/or other fasteners, such as strap ratchets, hooks, etc.) to be positioned at multiple positions around ULD pallet 1302 as needed to secure assets 1304 to ULD pallet 1302. In certain circumstances, assets 1304 may also be covered by a fireproof blanket (e.g., where assets include potentially volatile substances or battery powered devices).

FIG. 13 further illustrates a gateway node 1314 positioned on a building (but could be on other a vehicle, such as a tug at an airport for example), that forms part of a mesh network of a wireless tracking system 1300 (e.g., network communications environment 800 of FIG. 8) to facilitate communication between anchor-slot tape node 1306 and a cloud based server 1322. that collectively, with anchor-slot tape node 1306. Gateway node 1314 and/or anchor-slot tape node 1306 may communicate with tape nodes attached to individual assets 1304 when included.

Figure 14A:
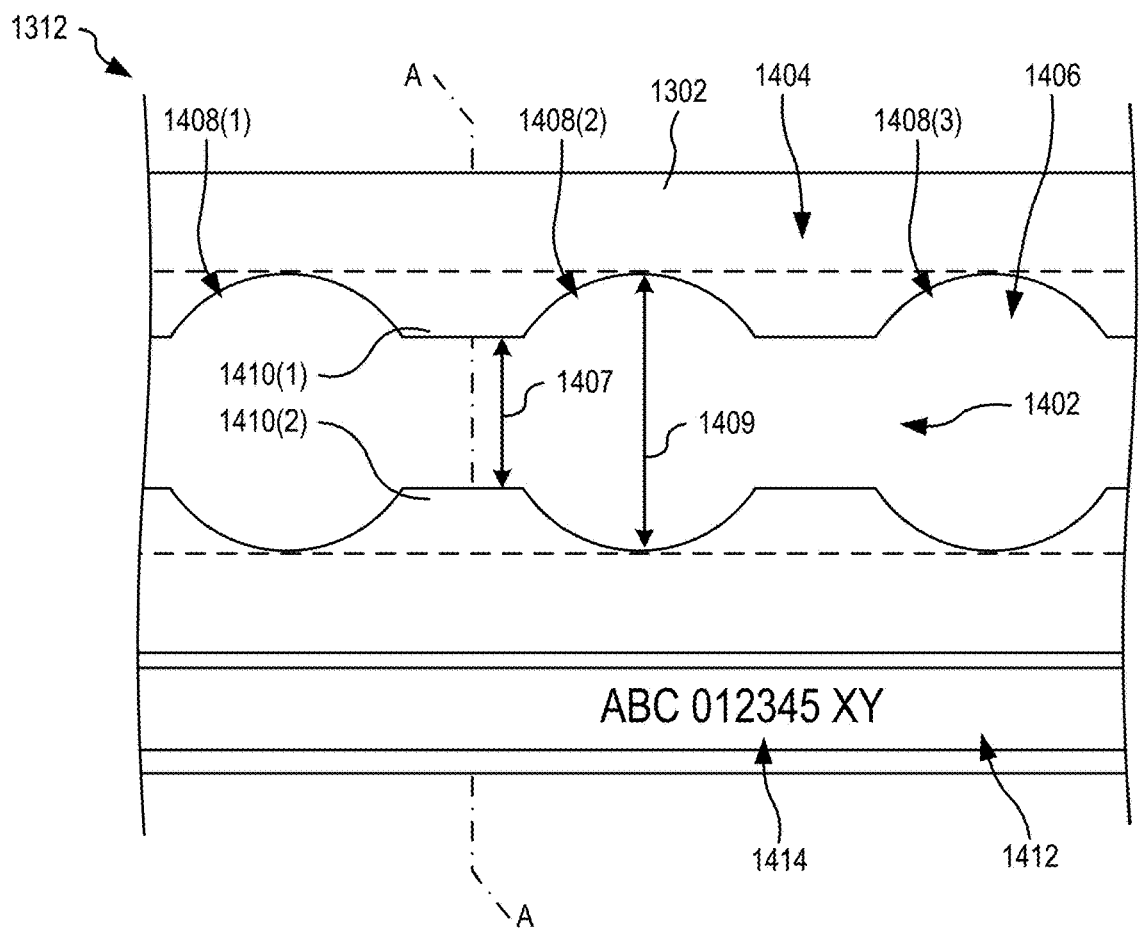
FIG. 14A is a schematic diagram illustrating a top view of an edge portion of the ULD pallet of FIG. 13, illustrating the anchor-slot in further example detail, in embodiments.
Figure 14B:
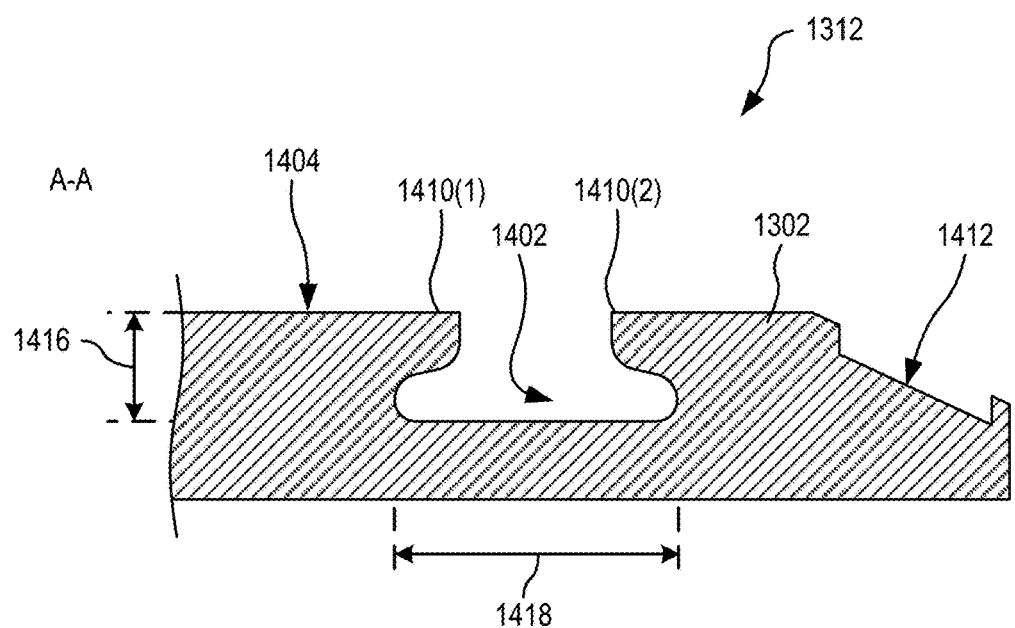
FIG. 14B is a cross-section A-A of the anchor-slot of FIG. 14A, in embodiments.

FIG. 14A is a schematic diagram illustrating a top view of an edge portion of ULD pallet 1302 of FIG. 13, illustrating anchor-slot 1312 in further example detail, in embodiments. FIG. 14B is a cross-section A-A of anchor-slot 1312 of FIG. 14A, in embodiments. FIGS. 14A and 14B are best viewed together with the following description. Anchor-slot 1312 may conform to MS 33601 Revision B, Jul. 31, 1991 "TRACK AND STUD FITTING FOR CARGO TRANSPORT AIRCRAFT, STANDARD DIMENSIONS FOR," for example. That is, anchor-slot 1312 is of a standard shape and size and has a defined internal structure as described herein.

Anchor-slot 1312 is formed as a channel 1402 beneath a top surface 1404 of ULD pallet 1302 with a channel depth 1416, from an inside bottom surface of channel 1402 to top surface 1404 of ULD pallet 1302, and a channel width 1418, as shown. Anchor-slot 1312 has a continuous top opening 1406 that has a first width 1407 at its narrowest (e.g., between lips 1410, described below) and a widest width 1409 formed by circular apertures 1408. Circular apertures 1408 (e.g., circular apertures 1408(1), 1408(2), and 1408(3)) are spaced (e.g., at a pitch) that is greater than a diameter of the circular apertures 1408, thereby forming lips 1410 (e.g., lips 1410(1) and 1410(2)) at top surface 1404 between pairs of circular apertures 1408. Edges of ULD pallet 1302 are beveled and include a recessed area 1412 that may include an identifying number 1414 (e.g., engraved, marked, attached) of ULD pallet 1302. In certain embodiments, channel width 1418 is 0.8 inches, channel depth 1416 is 0.308 inches, first width 1407 is 0.43 inches, widest width 1409 is 0.785 inches, and circular apertures 1408 are formed at a one-inch pitch.

Figure 15A:
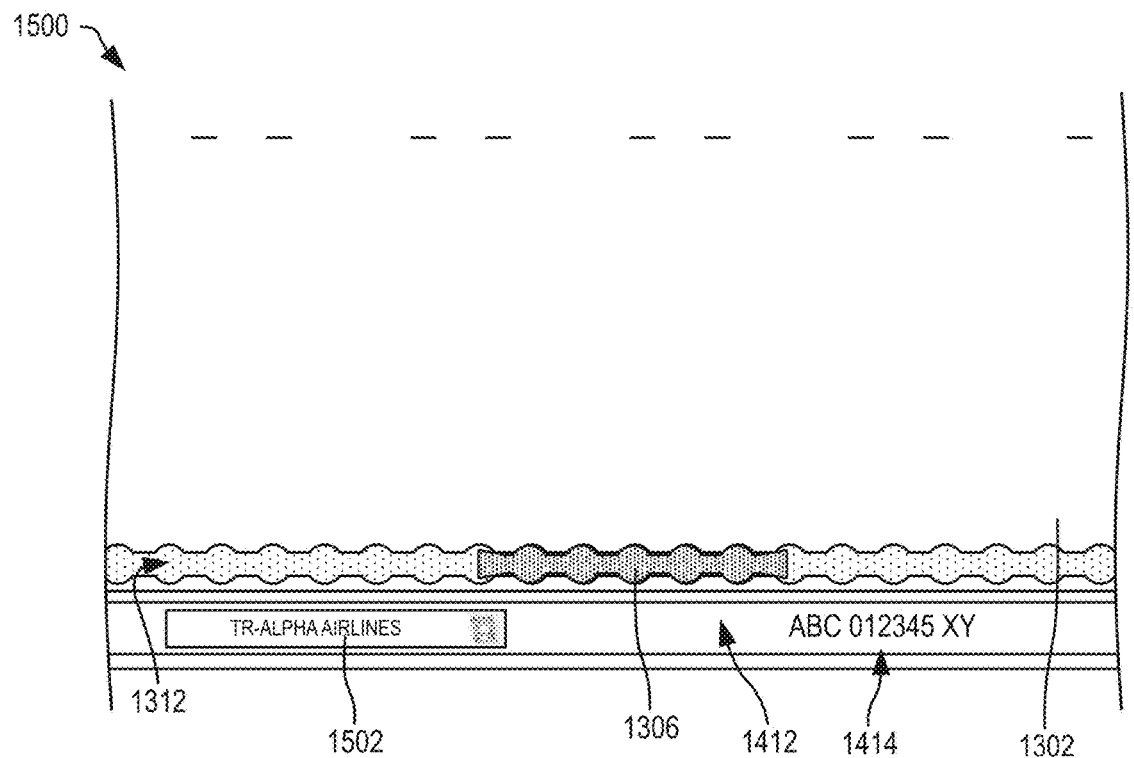
FIG. 15A is a schematic top view of one edge portion of the ULD pallet of FIG. 13, illustrating positioning of the anchor-slot tape node within the anchor-slot in further example detain, in embodiments.
Figure 15B:
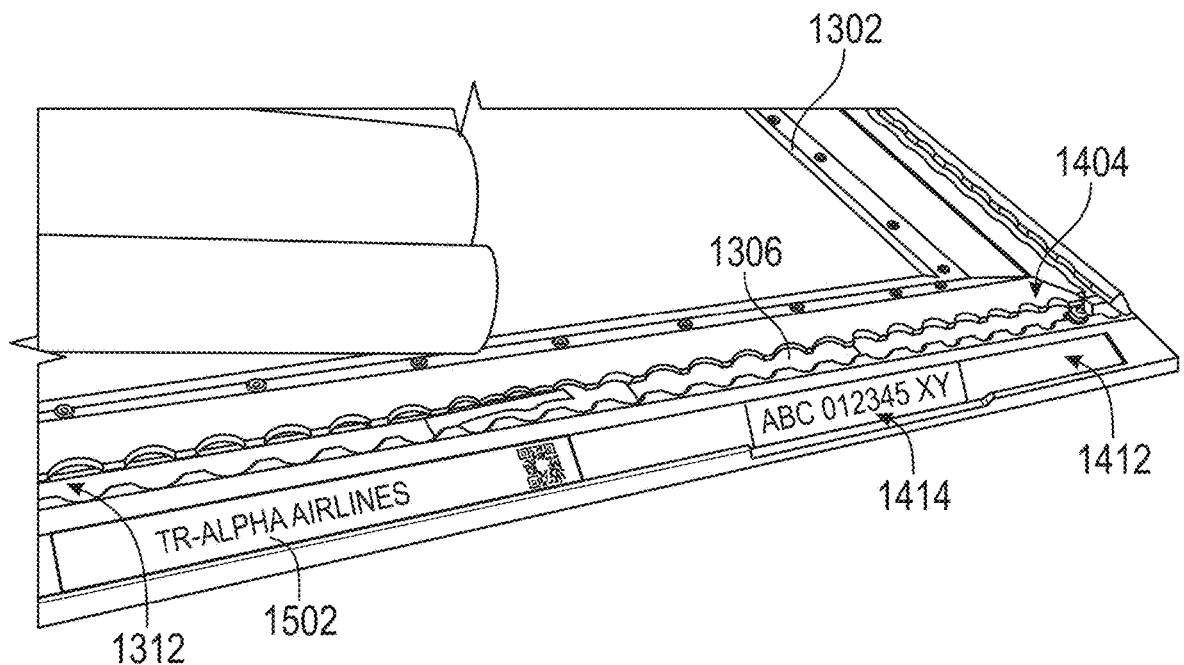
FIG. 15B is a perspective view of a corner of the ULD pallet of FIG. 13, in embodiments.

FIG. 15A is a schematic top view of one edge portion 1500 of ULD pallet 1302 of FIG. 13, illustrating positioning of anchor-slot tape node 1306 within anchor-slot 1312 in further example detain, in embodiments. FIG. 15B is a perspective view of a corner of ULD pallet 1302 of FIG. 13, in embodiments. FIGS. 15A and 15B are best viewed together with the following description. Anchor-slot tape node 1306 is sized and shaped to be retained, during normal operation of ULD pallet 1302, within anchor-slot 1312 by friction against the internal structure of anchor-slot 1312, and is also removable if needed. For example, anchor-slot tape node 1306 may be removed from a first ULD pallet and inserted into a second ULD pallet is needed, or anchor-slot tape node 1306 may be removed when its battery is low and replaced with a new anchor-slot tape node 1306. Advantageously, anchor-slot tape node 1306 is retained within anchor-slot 1312 without the use of adhesive or other fasteners.

In these examples, anchor-slot tape node 1306 occupies five circular apertures 1408 of anchor-slot 1312. For example, a transport company using ULD pallet 1302 may define rules that limit the continuous space (e.g., five circular apertures 1408) occupied by devices positioned within anchor-slot 1312. However, anchor-slot tape node 1306 may occupy more of fewer circular apertures 1408 without departing from the scope hereof.

When secured within anchor-slot 1312, anchor-slot tape node 1306 does not extend above top surface 1404 of ULD pallet 1302. That is, a height of anchor-slot tape node 1306 is equal to, or less than, and depth of anchor-slot 1312. Advantageously, anchor-slot tape node 1306 is thereby less likely to incur inadvertent damage when ULD pallet 1302 is stacked with other pallets and when ULD pallet 1302 is loaded/unloaded with assets 1304. Particularly, anchor-slot tape node 1306 is protected from physical damage by structure of ULD pallet 1302 that forms anchor-slot 1312.

Figure 16A:
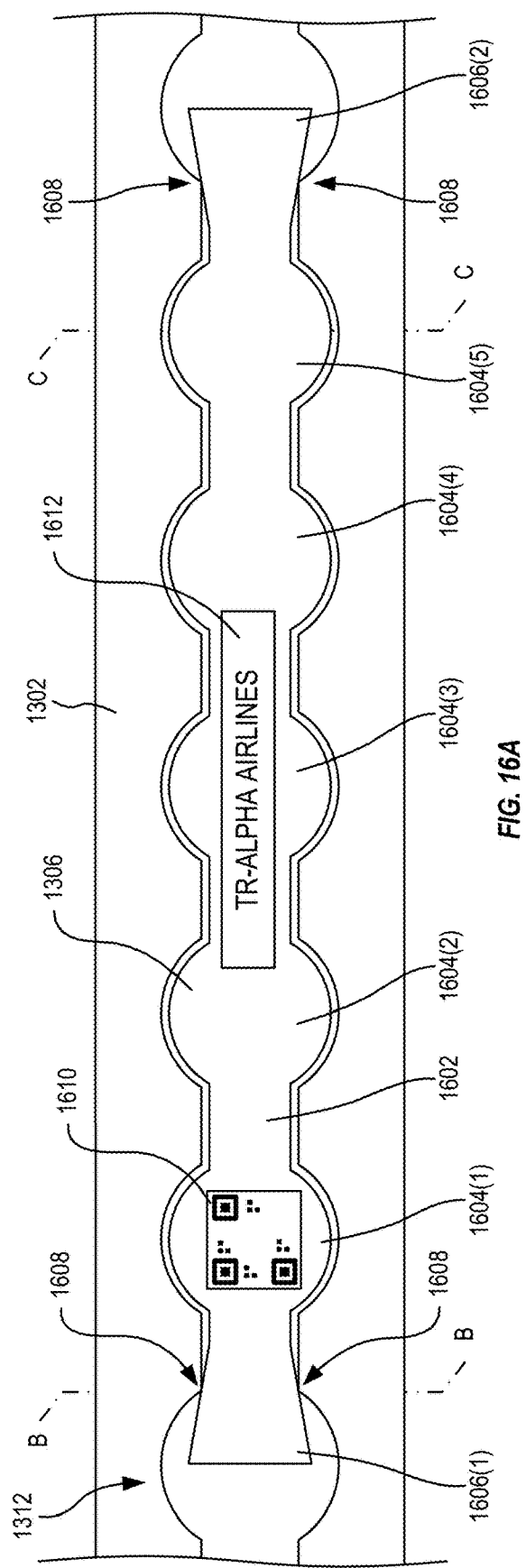
FIG. 16A is a schematic diagram illustrating example detail of the anchor-slot tape node of FIG. 13 positioned within the anchor-slot, in embodiments.
Figure 16B:
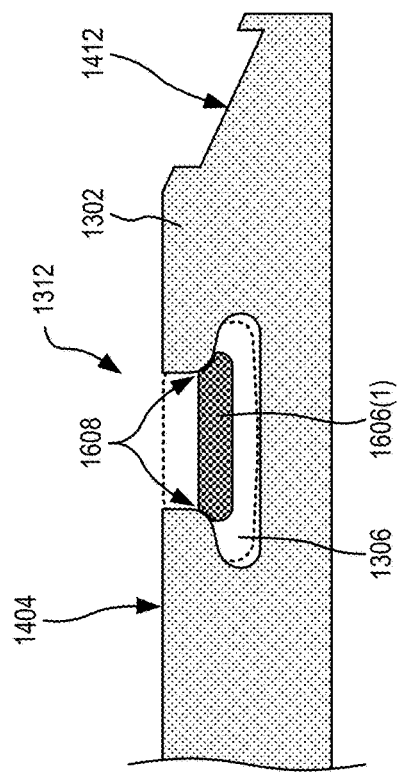
FIG. 16B is a cross-section B-B through a portion of the ULD pallet and the anchor-slot tape node of FIG. 16A, illustrating example retention of the anchor-slot tape node within the anchor-slot, in embodiments.

FIG. 16A is a schematic diagram illustrating example detail of anchor-slot tape node 1306 of FIG. 13 positioned within anchor-slot 1312, in embodiments. FIG. 16B is a cross-section B-B through a portion of ULD pallet 1302 and anchor-slot tape node 1306 of FIG. 16A, illustrating example retention of anchor-slot tape node 1306 within anchor-slot 1312, in embodiments. FIGS. 16A and 16B are best viewed together with the following description.

Anchor-slot tape node 1306 is formed as a rectangular strip 1602 joining five circular areas 1604(1)-1604(5). Rectangular strip 1602 is shaped and sized to fit between lips 1410 of continuous top opening 1406 of anchor-slot 1312. Circular areas 1604 are each sized and spaced to fit through circular apertures 1408 of continuous top opening 1406. Accordingly, anchor-slot tape node 1306 is sized and shaped to fit through continuous top opening 1406 and sit within channel 1402 of anchor-slot 1312 at or below top surface 1404 of ULD pallet 1302. For example, anchor-slot tape node 1306 has a maximum height of 8.5 mm, since channel depth 1416 is between 8 and 8.5 mm.

Anchor-slot tape node 1306 has a first flute 1606(1), positioned at a first end, and a second flute 1606(2), positioned at an opposite end, as shown in FIG. 16A. Each flute 1606 is a flexible flat taper that is springy such that it returns to the flat position without a deflecting force. Each flute 1606 has a narrow end joined to rectangular strip 1602 and a wide distal end that is wider than first width 1407 and narrower than widest width 1409 of continuous top opening 1406 of anchor-slot 1312. To insert anchor-slot tape node 1306 into channel 1402, flutes 1606 may be manually deformed (e.g., twisted by a person inserting anchor-slot tape node 1306 into anchor-slot 1312) to allow flutes 1606 to pass lips 1410 of continuous top opening 1406. When released, flutes 1606 untwist and contact respective lips 1410 to retained anchor-slot tape node 1306 within channel 1402 by friction at points 1608, against the internal structure of anchor-slot 1312 as shown. The operator may remove anchor-slot tape node 1306 from anchor-slot 1312 by twisting flutes 1606 to release the friction and by then lifting anchor-slot tape node 1306 through continuous top opening 1406. Flutes 1606 extend outwards 15 mm on each side of rectangular strip 1602, are 12.8 mm wide at the distal end (e.g., larger end), and are 10 mm wide at the join with rectangular strip 1602 (e.g., at the narrower end).

As shown in FIG. 16A, anchor-slot tape node 1306 may include one or both of a QR code 1610 (or a bar code) that is scannable to provide identification information of anchor-slot tape node 1306, and a label 1612 that provides written information, such as a brand name, airline name, and so on.

FIG. 17 is a cross-section C-C through ULD pallet 1302, anchor-slot 1312, and anchor-slot tape node 1306 of FIG. 16A, illustrating one example radio transmission envelope 1702 from a wireless communication interface of anchor-slot tape node 1306, in embodiments. Anchor-slot tape node 1306 includes a low-power wireless interface and/or medium-power wireless interface (e.g., see low-power wireless-communication interface 652' and medium-power communication-interface 672' of FIG. 6B) for communication with other nodes (e.g., gateway node 1314) of wireless tracking system 1300 of FIG. 13. Since anchor-slot tape node 1306 is positioned within anchor-slot 1312 and beneath top surface 1404 of ULD pallet 1302, wireless transmissions from anchor-slot tape node 1306 are restricted by the metal stricture of ULD pallet 1302.

In certain embodiments, to help alleviate this problem, antennae of anchor-slot tape node 1306 are positioned nearer to continuous top opening 1406 and configured to provide a more directional transmission beam. However, transmission may still be directionally restricted as illustrated by radio transmission envelope 1702. Particularly, given the shape and direction of continuous top opening 1406 of anchor-slot 1312, anchor-slot tape node 1306 has a strong (e.g., unrestricted) substantially vertical transmission strength, indicated by arrow 1704, through continuous top opening 1406, but has a weak (e.g., restricted) transmission strength in a horizontal direction, indicated by arrow 1706, as caused by metal of ULD pallet 1302. Accordingly, while communication range is unrestricted in the direction of arrow 1704, communication range is restricted in the direction of arrow 1706. Since ULD pallet 1302 are substantially always laid flat (e.g., parallel to the ground), this horizontal restriction causes anchor-slot tape node 1306 to have limited communication ability with other nodes of wireless tracking system 1300 in the horizontal direction.

Where this reduced communication range causes a problem, ULD pallet 1302 and anchor-slot tape node 1306 may be configured with a companion tape node 1502, as shown in FIGS. 15A and 15B. For example, companion tape node 1502 is mounted within recessed area 1412 of ULD pallet 1302 such that it is sufficiently close to anchor-slot tape node 1306 for communication with anchor-slot tape node 1306 (e.g., within the restricted horizontal communication range of anchor-slot tape node 1306). Companion tape node 1502 operates within the mesh network of wireless tracking system 1300 to relay messages between anchor-slot tape node 1306 and other nodes (e.g., gateway node 1314) of wireless tracking system 1300. In certain embodiments, anchor-slot tape node 1306 implements only short-range communication (e.g., Bluetooth Low energy) for communicating with companion tape node 1502.

Since companion tape node 1502 is at an edge of ULD pallet 1302, wireless transmissions from companion tape node 1502 are significantly less restricted and thus communication from anchor-slot tape node 1306 is improved. Further, antennae within companion tape node 1502 may be configured to transmit at the greatest strength in a more horizontal direction from pallet 1302. In certain embodiments, ULD pallet 1302 operates as a ground place for companion tape node 1502 and may increase its communication range. Recessed area 1412 provides a certain amount of protection for companion tape node 1502; however, companion tape node 1502 may be more susceptible to accidental damage than anchor-slot tape node 1306. Companion tape node 1502 may be specifically designed to fit within recessed area 1412, for example, and may be replaced as needed.

Anchor-Slot Tape Node Construction

Figure 18A:
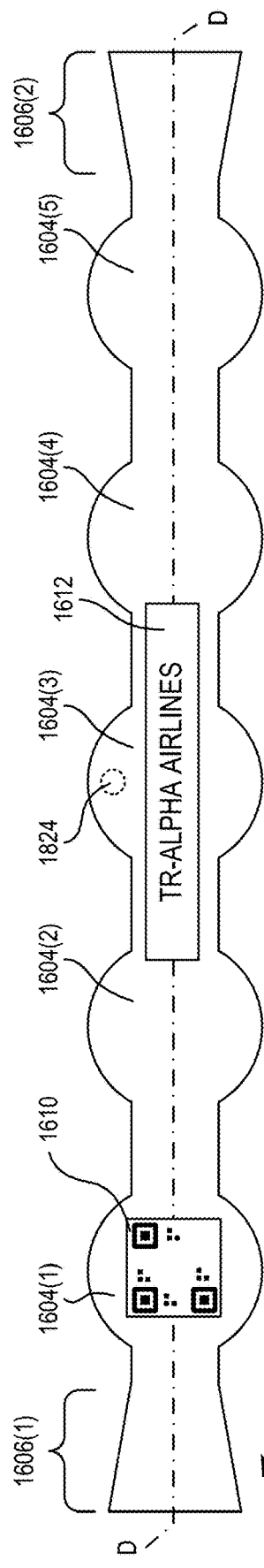
FIGS. 18A, 18B, 18C, and 18D, are schematic diagrams illustrating example construction of the anchor-slot tape node of FIG. 13, in embodiments.
Figure 18B:
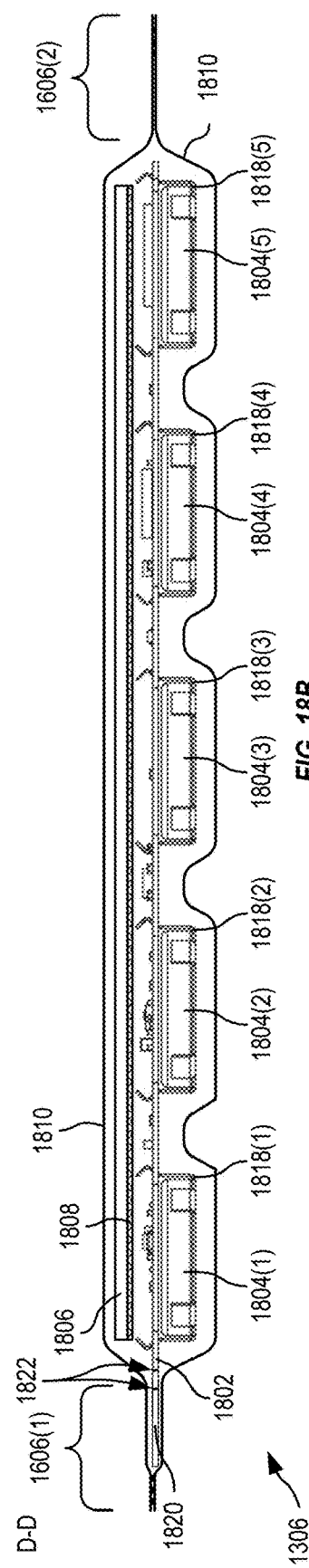
Figure 18C:
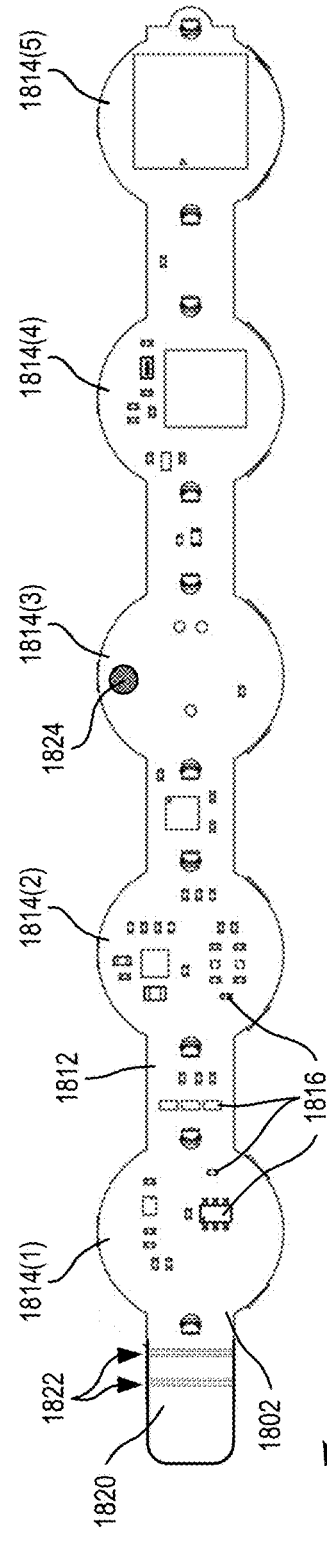
Figure 18D:
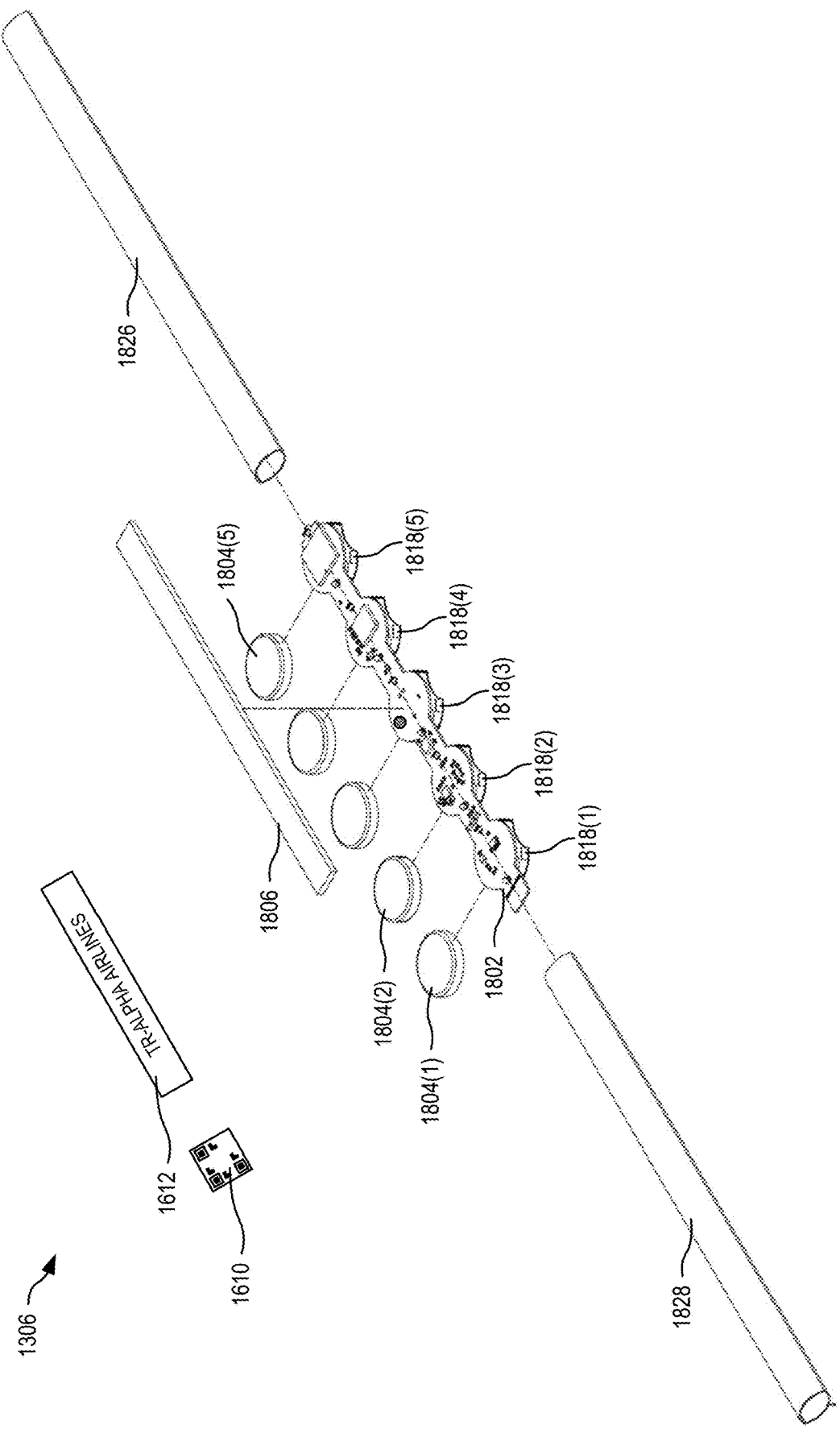

FIGS. 18A, 18B, 18C, and 18D, are schematic diagrams illustrating example construction of anchor-slot tape node 1306 of FIG. 13, in embodiments. FIGS. 18A, 18B, 18C, and 18D are best viewed together with the following description. FIG. 18A shows a complete anchor-slot tape node 1306, FIG. 18B shows a cross section D-D through anchor-slot tape node 1306 of FIG. 18A, FIG. 18C shows shape-forming components of anchor-slot tape node 1306 prior to assembly, and FIG. 18D shows an exploded view of anchor-slot tape node 1306 to illustrate example assembly.

Anchor-slot tape node 1306 includes a circuit board 1802, five batteries 1804(1) and 1804(2), a stiffener 1806, an insulator 1808 (optional), and an outer casing 1810. Circuit board 1802 is one of a semi-rigid printed circuit board and a flex circuit, as known in the art. Circuit board 1802 is shaped and sized based on continuous top opening 1406 and channel 1402 of anchor-slot 1312. For example, circuit board 1802 has a long rectangular central portion 1812 that connects five circular areas 1814(1)-(5) that are spaced along long rectangular central portion 1812 to align with circular apertures 1408 of continuous top opening 1406. In certain embodiments, circuit board 1802 is a flex circuit. In other embodiments, circuit board 1802 is a semi-rigid circuit board. Circuit board 1802 is populated with components 1816 that provide functionality of anchor-slot tape node 1306. In certain embodiments, circuit board 1802 is similar to flexible circuit 648' of FIG. 6B and includes similar components.

In the example of FIGS. 18A, 18B, 18C, and 18D, batteries 1804 are button type cells (e.g., CR1632) that are inserted into battery holders 1818 mounted beneath circuit board 1802, one at each circular area 1814. Although shown with five batteries 1804, anchor-slot tape node 1306 may have fewer batteries without departing from the scope hereof. For example, circuit board 1802 may be fitted with Batteries 1804 may have a diameter that is smaller than widest width 1409 of continuous top opening 1406 of anchor-slot 1312 and are positioned to align with a respective one of circular areas 1814 of circuit board 1802. Circuit board 1802 may have thru-hole vias for wires coming from batteries 1804 to connect to components 1816 on a top side of circuit board 1802. In certain embodiments, anchor-slot tape node 1306 may have one or more long thin batteries that sit lengthways beneath long rectangular central portion 1812 of circuit board 1802.

Stiffener 1806 may be included to add rigidity to anchor-slot tape node 1306 and may also provide protection to a top surface of circuit board 1802. In certain embodiments, stiffener 1806 is a linear strip of aluminum with a length similar to circuit board 1802 and a width less than a width of long rectangular central portion 1812. Accordingly, insulator 1808 is included to electrically insulate a lower surface of stiffener 1806 to prevent electrical interference with components 1816 of circuit board 1802. Insulator 1808 is for example Kapton tape that adheres to a lower surface of stiffener 1806 or is wrapped around stiffener 1806 when stiffener 1806 is made with an electrically conductive material (e.g., aluminum). In certain embodiments, stiffener 1806 is shaped similarly to circuit board 1802 and includes circular areas corresponding to circular areas 1814. In certain embodiments, stiffener 1806 may be shaped and/or sized to reduce interference with wireless communication interfaces of anchor-slot tape node 1306. For example, stiffener 1806 may have cut-outs and/or apertures near antennae of the wireless communication interfaces of anchor-slot tape node 1306.

Outer casing 1810 is a ruggedized material that provides protection to anchor-slot tape node 1306 against its environment which includes being exposed to weather. In certain embodiments, outer casing 1810 is formed by shrinking a heat-shrink tube around the assembled circuit board 1802, batteries 1804, stiffener 1806, and insulator 1808. Outer casing 1810 is for example a flexible polyolefin tube 1826 of approximately six-inches in length and half an inch in diameter that is shrunk around the assembled circuit board 1802, batteries 1804, stiffener 1806, and insulator 1808. Polyolefin tube 1826 is placed over the assembled circuit board 1802, batteries 1804, stiffener 1806, and insulator 1808 and then heated, using a heat gun (e.g., a hot air blower or an infrared heater) starting in the center and working outwards for example, to cause polyolefin tube 1826 to shrink in diameter around the assembled components and form outer casing 1810. The ends of polyolefin tube 1826 are flattened and sealed together using a thermal sealing device (e.g., a bag sealer) to form flutes 1606. For example, three seals may be formed at each flute 1606 to ensure ingress of moisture is prevented. Accordingly, outer casing 1810 fully encloses the assembled circuit board 1802, batteries 1804, stiffener 1806, and insulator 1808.

Advantageously, in the unlikely event that all three thermal seals at any one of flutes 1606 fail, flute 1606 is held above a bottom of channel 1402 of anchor-slot 1312 (since the bottom of outer casing 1810 around batteries 1804 contacts the bottom of channel 1402) and therefore ingress of water is unlikely. For example, for water ingress at flute 1606, all three seals need to fail and a water level in channel 1402 needs to be at or above a height of flute 1606. That is, channel 1402 needs to be nearly full of water.

Servicing of anchor-slot tape node 1306 is possible by removing outer casing 1810 (e.g., slitting outer casing 1810 at an underside of anchor-slot tape node 1306), replacing batteries 1804, and recovering circuit board 1802, stiffener 1806, and batteries 1804 with a new outer casing 1810, shrinking it into place using the heat gun.

As shown in FIGS. 16A and 18A, one or both of QR code 1610 and label 1612 may be visible at an outer surface of outer casing 1810. In this embodiment, outer casing 1810 may be formed from two polyolefin tubes 1826 and 1828, where QR code 1610 and label 1612 are positioned between a first substantially opaque polyolefin tube 1826 and a clear polyolefin tube 1828 (or other clear material) formed over at least part of polyolefin tube 1826 to protect QR code 1610 and label 1612 and thereby form outer casing 1810.

Anchor-slot tape node 1306 may include a sensor stack (e.g., a set of sensors) that includes one or more of a temperature sensor, a humidity sensor, an air pressure sensor, a force/pressure sensor, an accelerometer, a gyroscope, a magnetometer (6-axis motion sensor), a vibration sensor, and a sound sensor (e.g., microphone). Accordingly, anchor-slot tape node 1306 may monitor an environment of ULD pallet 1302 during tracking.

Installing and Activating an Anchor-Slot Tape Node

In one example of operation, an operator installs anchor-slot tape node 1306 into ULD pallet 1302 by pressing circular areas 1604 into circular apertures 1408 of anchor-slot 1312. As described above, flutes 1606 may be twisted axially to slide past lips 1410 and thereby allow a bottom surface of anchor-slot tape node 1306 to tough a bottom surface of channel 1402. Anchor-slot tape node 1306 is retained within anchor-slot 1312 when flutes 1606 untwist to contact lips 1410 at points 1608, preventing anchor-slot tape node 1306 from falling out of channel 1402.

In certain embodiments, anchor-slot tape node 1306 remains inactive until needed for operation, whereby an operator activates anchor-slot tape node 1306 prior to, or after, installing anchor-slot tape node 1306 in anchor-slot 1312. In the inactive state the anchor-slot tape node may operate with minimal or zero power consumption. For example, in the inactive state, the anchor-slot tape node 1306 may be completely powered off or disconnected from its power source. In another example, in the inactive state, the anchor-slot tape node 1306 may be configured to disable wireless communications and conserve energy. After activation, the anchor-slot tape node initializes and transitions into a state with higher power consumption. The higher power state may include activating and operating components of its wireless transducing circuit and performing a variety of functions. In some embodiments, it enters a higher power state according to a distributed intelligent software.

In the embodiments of FIGS. 18A-18D, circuit board 1802 includes a break tab 1820, positioned at one end of circuit board 1802, that extends into first flute 1606(1). Break tab 1820 operates similarly to wake circuit 775 of FIGS. 7A-7B, whereby break tab 1820 includes a shunt-wire that inhibits operation of anchor-slot tape node 1306 while a break-point 1822 remains intact. When the operator breaks break tab 1820 at break-point 1822, by flexing first flute 1606(1) up and down for example, the shunt circuit is broken at break-point 1822 and anchor-slot tape node 1306 is activated. In certain embodiments, as shown in FIGS. 18B and 18C, two break-points 1822 are formed in circuit board 1802 proximate break tab 1820. Advantageously, two break-points 1822 provides redundancy to ensure that the shunt-wire is broken and anchor-slot tape node 1306 is activated when first flute 1606(1) is flexed by the operator.

In another embodiment, anchor-slot tape node 1306 is provided on a roll and activated when anchor-slot tape node 1306 is separated from the roll (e.g., by cutting, or tearing along a perforation, etc.). In another embodiment, one of flutes 1606 is elongated and includes a shunt-wire, whereby flute 1606 is cut (e.g., trimmed to a certain length or at an indicated line) to cut the shunt-wire and activate anchor-slot tape node 1306.

In certain embodiments, break-point 1822 and the shunt-wire are omitted and anchor-slot tape node 1306 is activated by a Bluetooth low energy (BLE) wake-signal. In this embodiment, anchor-slot tape node 1306 is supplied in a low-power state that activates its BLE receiver (e.g., low-power wireless-communication interface 652 of FIG. 6A) at intervals to detect the BLE wake-signal. When the BLE wake-signal is detected, anchor-slot tape node 1306 transitions to an active or operational state. For example, the operator may use an app running on a smart phone to generate the BLE wake-signal, such as when installing anchor-slot tape node 1306 into anchor-slot 1312. When in the low-power state, anchor-slot tape node 1306 uses slightly more (e.g., a small amount) power from its battery as compared to embodiments that include break-point 1822 and the shunt-wire. Anchor-slot tape node 1306 may use a wireless wake signals with other frequencies and/or protocols without departing from the scope hereof. For example, anchor-slot tape node 1306 may implement one or more of a LoRa wake signal, a cellular wake signal, a Wi-Fi wake signal, and so on. Particularly, the implemented size of anchor-slot tape node 13106 may allow for different types of antennas and/or communication interfaces.

In embodiments wherein the break point 1822 and the shunt-wire are omitted, the anchor-slot tape node 1306 operates in a sleep or low-power state, before activation. For example, while the anchor-slot tape node is in storage or is being transported prior to deployment, the anchor-slot tape node may operate in the sleep or low-power state before activation. In the sleep or low-power state, the anchor-slot tape node 1306 periodically activates its wireless communication system to attempt to receive the BLE wake-signal. If it does not receive the BLE wake-signal, the anchor-slot tape node 1306 continues to operate in the sleep or low-power state. If the anchor-slot tape node receives the BLE wake-signal while in the sleep or low-power state, the anchor slot tape node activates and changes its state to a state with higher power consumption. The higher power state may include activating and operating components of its wireless transducing circuit and performing a variety of functions. In some embodiments, it enters a higher power state according to a distributed intelligent software. Further detail of states and transitions between states is found in U.S. patent application Ser. No. 17/448,346, which is incorporated herein by reference. For example, distributed intelligent software may dictate behavior of anchor-slot tape node 1306, whereby activation triggers a change from a semi-sleep state to other states, where anchor-slot tape node 1306 starts tracking location of ULDs and reporting its location to cloud based server 1322 on a schedule or depending on detected conditions/events for the ULD.

In certain embodiments, components 1816 of circuit board 1802 include a hall-effect sensor (e.g., a magnetic sensor), where other circuitry of circuit board 1802 remains inactive until a magnetic field of a certain strength and or polarity and/or with a certain repetition is sensed by the hall-effect sensor. In another embodiment, components 1816 of circuit board 1802 include at least one accelerometer (e.g., see sensing transducers 424 of FIG. 4), wherein components 1816 remain substantially inoperable (e.g., in a low power drain mode) until the accelerometer senses repeated shaking of 1306. Once activated, anchor-slot tape node 1306 manages its own power conservation based on detected activity and/or events, for example.

In certain embodiments, anchor-slot tape node 1306 is configured with a light sensor 1824, mounted on circuit board 1802 that is positioned to face out from anchor-slot 1312 when anchor-slot tape node 1306 is installed therein. That is, light sensor 1824 faces upwards from anchor-slot tape node 1306 (e.g., outwards from 1306 of FIGS. 18A and 18C, and up from FIG. 18B). In these embodiments, outer casing 1810 is formed of one or more translucent layers (e.g., one or more flexible clear, or semi-clear, polyolefin tubes) that allows ambient light to pass therethrough to reach light sensor 1824. In certain embodiments, outer casing 1810 forms an aperture and/or includes a clear window that is aligned with light sensor 1824 to allow ambient light to reach light sensor 1824.

In certain embodiments, anchor-slot tape node 1306 uses light sensor 1824 to detect when a container or cargo space that contains ULD pallet 1302 is unexpectedly opened. For example, when closed, ambient light within the contain is minimal, but increases when the container is opened. In one example of operation, where the container awaits a transportation vehicle, the container, once loaded, should not be open until a destination location is reached. Accordingly, anchor-slot tape node 1306 is configured to detect when the contain is opened and in response to generate an alarm (e.g., a buzzer, illuminate an LED, transmit an alarm notification message, and so on). In certain embodiments, anchor-slot tape node 1306 uses light sensor 1824 to determine when to transition between active and inactive modes that conserve battery power.

Alternative Embodiments of an Anchor-Slot Tape Node

FIGS. 19A and 19B are schematic diagrams illustrating example construction of an extended anchor-slot tape node 1900, in embodiments. FIG. 19A is a schematic top view of anchor-slot tape node 1900 and FIG. 19B is a cross-section E-E of anchor-slot tape node 1900 of FIG. 19A. Anchor-slot tape node 1900 is similar to anchor-slot tape node 1306 and has similar functionality, but is designed with eight circular areas 1912 that occupy eight consecutive circular apertures 1408 of anchor-slot 1312. Anchor-slot tape node 1900 is shown with eight batteries 1904 (e.g., similar to batteries 1804 of FIGS. 18B and 18D) mounted in battery holders 1918; however, anchor-slot tape node 1900 may have fewer batteries 1904 without departing from the scop hereof. For example, the number of batteries 1904 installed with anchor-slot tape node 1900 is based on a power requirement of anchor-slot tape node 1900. The greater the number of batteries 1904 installed, the longer an operational time of anchor-slot tape node 1900 for example. When one or more batteries are omitted, the corresponding battery holder 1918 may also be omitted.

Anchor-slot tape node 1900 includes a printed circuit board 1902 that may be formed with a break tab 1920 that operates similarly to break tab 1820 of circuit board 1802. Anchor-slot tape node 1900 also includes a stiffener 1906 and optional insulator 1908 that is sized to match printed circuit board 1902. An outer casing 1910 is formed, similarly to outer casing 1810 of anchor-slot tape node 1306, and is molded to create flutes 1916(1) and 1916(2) at either end of anchor-slot tape node 1900, where flutes 1916 function similarly to flutes 1606 to removably retain anchor-slot tape node 1900 within anchor-slot 1312. Outer casing 1910 may be formed in two layers (e.g., similar to polyolefin tube 1826 and two polyolefin tubes 1828 of FIGS. 18A-18D) and encapsulate a QR code 1922 and/or a label 1924. Anchor-slot tape node 1900 may include a light sensor 1926 for detecting ambient light as described above for anchor-slot tape node 1306.

Figure 20A:
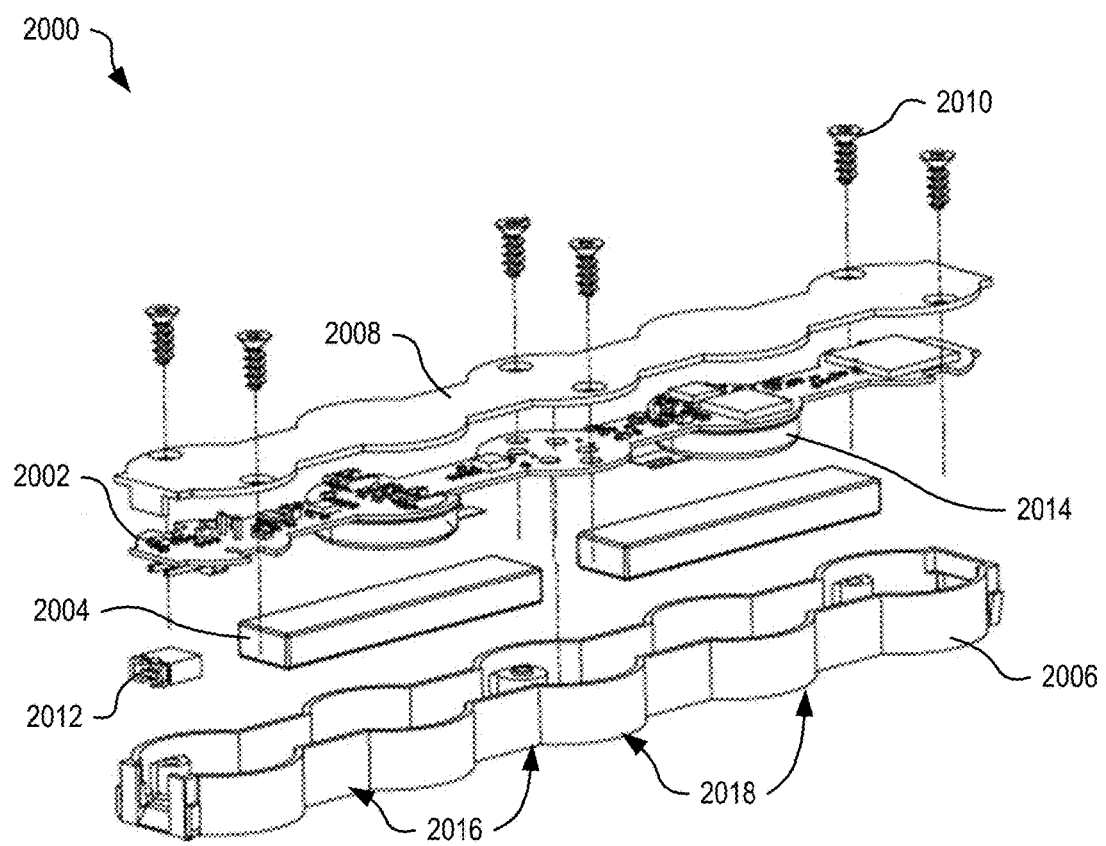
FIG. 20A is a perspective exploded view of one example anchor-slot tape node with a hard casing, in embodiments.
Figure 20B:
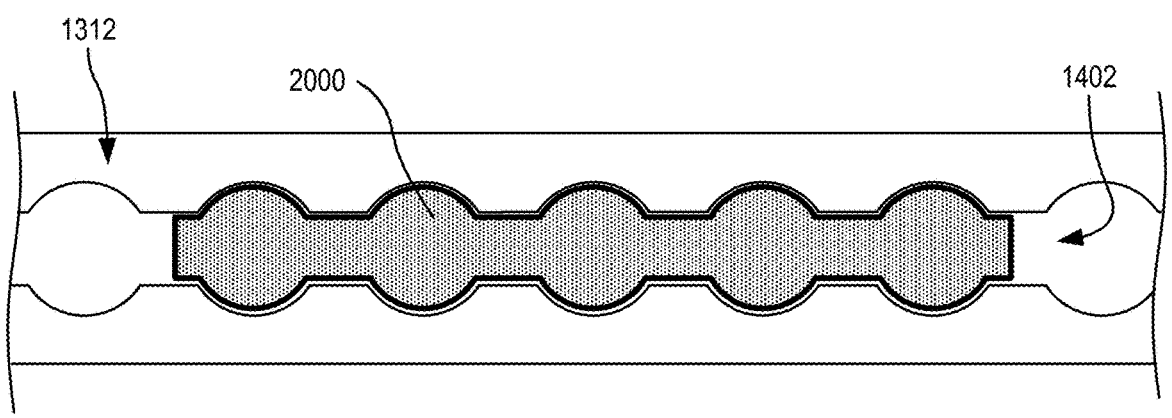
FIG. 20B is a plan view illustrating the anchor-slot tape node, of FIG. 20A, installed within the channel of the anchor-slot, in embodiments.

FIG. 20A is a perspective exploded view of one example anchor-slot tape node 2000 with a hard casing, in embodiments. FIG. 20B is a plan view illustrating anchor-slot tape node 2000, of FIG. 20A, installed within channel 1402 of anchor-slot 1312, in embodiments.

Anchor-slot tape node 2000 includes a printed circuit board 2002, at least one battery 2004, a bottom case 2006, and a top case 2008. Printed circuit board 2002 is similar to circuit board 1802 of FIGS. 18B-18C and includes circular areas corresponding to circular apertures 1408 of continuous top opening 1406 of FIGS. 14A and 14B.

Battery 2004 is of a rectangular shape that sits beneath a long rectangular central portion of printed circuit board 2002. However, as shown in FIG. 20A, anchor-slot tape node 2000 may also use a button battery 2014 (e.g., similar to battery 1804 of FIGS. 18B and 18D) positioned beneath one of the circular areas of printed circuit board 2002 and used with or in place of battery 2004.

Top case 2008 attaches to bottom case 2006 using screws 2010, for example, to enclose printed circuit board 2002 and battery 2004 therein. Bottom case 2006 and top case 2008 are semi-rigid (e.g., a molded plastic material) and shaped and sized to fit through continuous top opening 1406 of anchor-slot 1312 with friction. For example, rectangular portions 2016 of bottom case 2006 and/or top case 2008 may be sized to cause friction with lips 1410 of continuous top opening 1406 such that anchor-slot tape node 2000 is retained within channel 1402. Similarly, rounded portions 2018 of bottom case 2006 and/or top case 2008 may be sized to cause friction with circular apertures 1408 of continuous top opening 1406. One or both of bottom case 2006 and top case 2008 may include a seal (or have sealant applied) to prevent ingress of moisture.

Anchor-slot tape node 2000 may include a shunt 2012, positioned at one end of bottom case 2006 for example, that wakes components of printed circuit board 2002 when activated. That is, components of printed circuit board 2002 remain inactive until shunt 2012 is activated to initiate operation of anchor-slot tape node 2000. In other embodiments, as described above for anchor-slot tape node 1306, anchor-slot tape node 2000 may include one or both of a hall-effect sensor and at least one accelerometer that are used to detect intended activation of anchor-slot tape node 2000.

Figure 21:
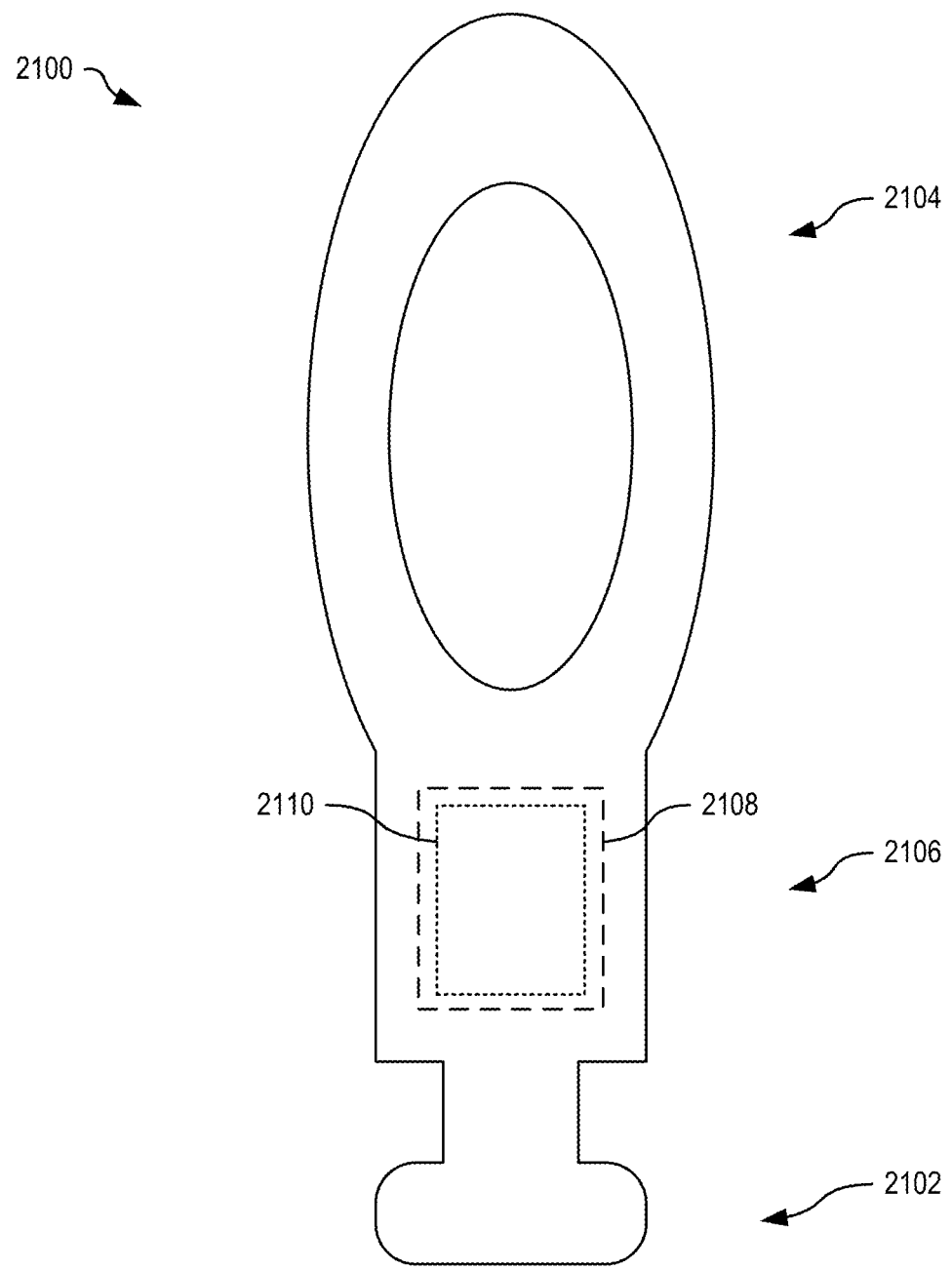
FIG. 21 is a schematic illustrating one example anchor-ring tape node that couples with the anchor-slot of the ULD pallet, tracks movement of the ULD pallet, and is used to secure assets to the pallet, in embodiments.

FIG. 21 is a schematic illustrating one example anchor-ring tape node 2100 that couples with anchor-slot 1312 of ULD pallet 1302, tracks movement of ULD pallet 1302, and may couple with a restraint (e.g., a rope, a net, a strap, etc.) used to secure assets 1304 to ULD pallet 1302, in embodiments. Anchor-ring tape node 2100 may be used in place of one anchor ring 1310 of FIG. 13 and includes tracking functionality similar to anchor-slot tape node 1306.

Anchor-ring tape node 2100 includes an anchor portion 2102, a ring portion 2104, and a stem portion 2106. Anchor portion 2102 is secured within an anchor-slot (e.g., anchor-slot 1312 of FIG. 13) of a pallet (e.g., pallet 1302). In the example of FIG. 21, ring portion 2104 is a loop that may attach to the restraint such as a rope, a net, and/or strap that is used to secure assets (e.g., assets 1304) on the pallet. However, ring portion 2104 may have other forms, such as a hook, a ratchet, etc., without departing from the scope hereof.

Stem portion 2106 provides structural and/or mechanical support between anchor portion 2102 and ring portion 2104 and further forms a housing 2108 that includes a wireless tracking circuit 2110 (e.g., wireless transducing circuit 410 of FIG. 4) for tracking the pallet and/or the assets loaded thereof. In certain embodiments, housing 2108 and wireless tracking circuit 2110 are positioned within ring portion 2104 instead of stem portion 2106.

Figure 22A:
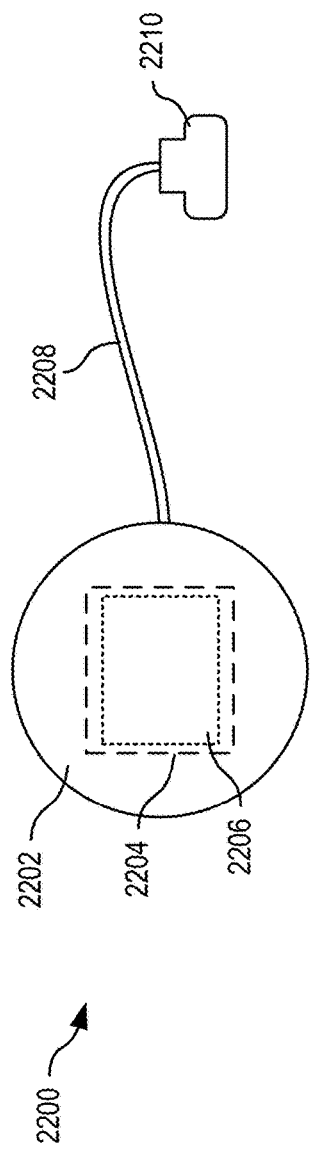
FIG. 22A is a schematic illustrating one example leashed tape node that attaches to the anchor-slot of FIG. 13 of the ULD pallet, in embodiments.
Figure 22B:
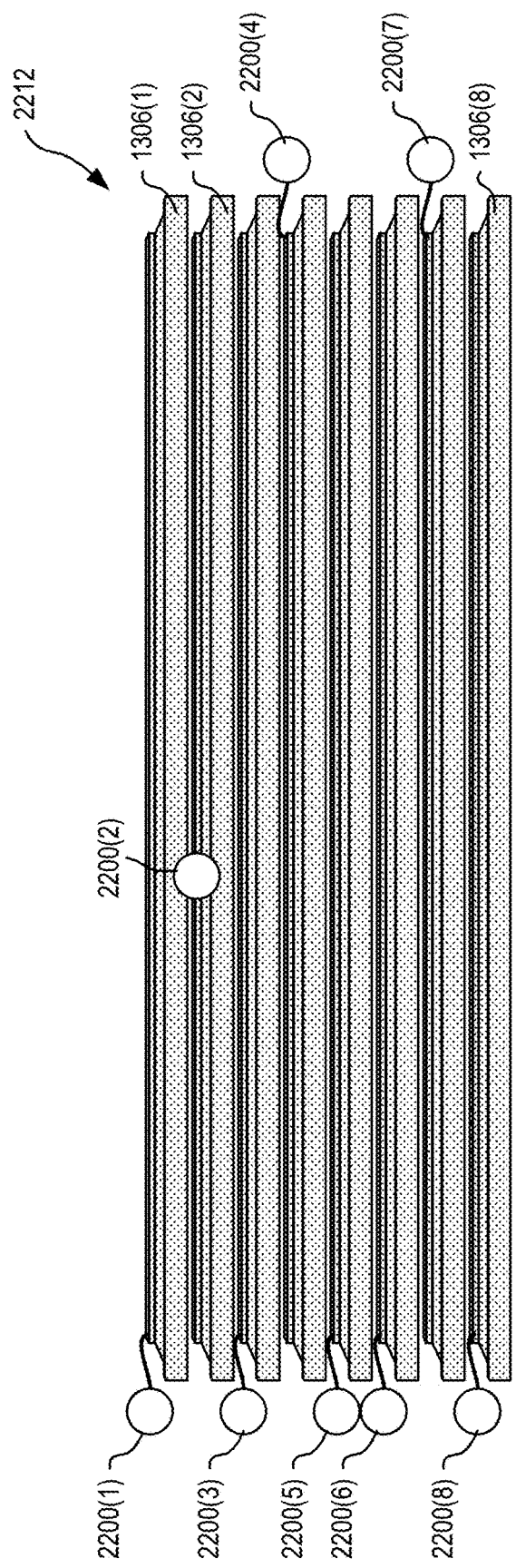
FIG. 22B is a schematic illustrating a ULD pallet stack of eight ULD pallets, each having an attached leashed tape node of FIG. 22A, in embodiments.

FIG. 22A is a schematic illustrating one example leashed tape node 2200 that attaches to anchor-slot 1312 of FIG. 13 of ULD pallet 1302, in embodiments. FIG. 22B is a schematic illustrating a ULD pallet stack 2212 of eight ULD pallets 1306(1)-(8) (not all pallets are number for clarity of illustration), each having an attached leashed tape node 2200(1)-(8), respectively, in embodiments. FIGS. 22A and 22B are best viewed together with the following description.

Leashed tape node 2200 includes a housing 2202 and an anchor 2210 that are physically connected by a flexible tether 2208. Housing 2202 is rugged and forms a cavity 2204 for a wireless tracking circuit 2206 (e.g., wireless transducing circuit 410 of FIG. 4) that functions to track a corresponding ULD pallet 1302 when attached thereto. Housing 2202 may be any shape and size without departing from the scope hereof. For example, housing 2202 may be one of spherical, as shown, cuboid, and cylindrical, or any combination thereof. In certain embodiments, an outer surface of housing 2202 includes solar harvesting components such that wireless tracking circuit 2206 operates as a solar tape node. Anchor 2210 is shaped and sized to couple with the anchor-slot (e.g., at any position around the perimeter) of the corresponding ULD pallet 1302 and flexible tether 2208 allows housing 2202 to position adjacent the ULD pallet, as shown in FIG. 22B. Advantageously, a top surface of the ULD pallet is unobstructed by leashed tape node 2200, and therefore leashed tape node 2200 is less likely to be damaged during loading and unloading of assets. Further, flexible tether 2208 allows housing 2202 to reposition, within limits of flexible tether 2208, such that any knocks are less destructive to housing 2202 and wireless tracking circuit 2206. Flexible tether 2208 is for example one of a chain, a cord, a rope, a strap, and so on.

Each pallet 1302 has at least one leashed tape node 2200 attached to it. As shown in FIG. 22B, pallets corresponding ULD pallet 1302 may be stacked without being impeded by leashed tape node 2200. Further, wireless transmissions from communication interfaces of wireless tracking circuit 2206 are less restricted by ULD pallet 1302. For example, metal of ULD pallet 1302 may interfere with wireless signal to and from anchor-slot tape node 1306 when embedded into anchor-slot 1312. Advantageously, housing 2202 of leashed tape node 2200 is not positioned within the anchor-slot and thereby wireless signals to and from wireless tracking circuit 2206 are less restricted. Further, since housing 2202 is not restricted to fit within the anchor-slot, housing 2202 may house a larger battery to provide a longer operational life as compared to batteries 1804 and operational life of anchor-slot tape node 1306.

Additional Operational Examples

U.S. patent application Ser. No. 18/433,227, filed Feb. 5, 2024, titled "Monitoring of Unit Load Device and Carts Using Wireless IoT devices," is incorporated herein by reference to provides additional support.

As shown by the examples of FIGS. 13-22B, anchor-slot 1312 of ULD pallet 1302 is fitted with one or more of anchor-slot tape node 1306, anchor-slot tape node 1900, anchor-slot tape node 2000, anchor-ring tape node 2100, and leashed tape node 2200, and recessed area 1412 of ULD pallet 1302 may be fitted with companion tape node 1502. Each of anchor-slot tape node 1306, anchor-slot tape node 1900, anchor-slot tape node 2000, anchor-ring tape node 2100, and leashed tape node 2200 may include sensors for detecting environmental changes, such as movement. Where anchor-slot tape node 1306, when loaded with assets 1304 or when part of ULD pallet stack 2212, is moved by a vehicle (e.g., a fork-lift truck), a gateway node on the vehicle (e.g., see U.S. patent application Ser. No. 18/433,227, gateway node 1314 of loader 1304 of FIG. 13 and gateway node 1414 of tug 1410 of FIG. 14A) is triggered by detected movement to scan for tape nodes. Where the vehicle is a fork-lift truck, the gateway node may be triggered by sensed force on the forks of the vehicle as anchor-slot tape node 1306 is lifted.

Similarly, where anchor-slot tape node 1306, anchor-slot tape node 1900, anchor-slot tape node 2000, anchor-ring tape node 2100, leashed tape node 2200, and companion tape node 1502 senses movement, the sensed movement may cause the tape node to broadcast on a motion communication channel, as opposed to broadcasting on a stationary communication channel. For example, detecting a change in ambient air-pressure may indicate a change in altitude indicative of anchor-slot tape node 1306 being loaded into a transport vehicle, thereby triggering the tape node to communicate with a nearby gateway node. The detected movement may also trigger an algorithm within the tape node that verifies a location of the tape node by communicating with other tape nodes and/or using other location techniques. The algorithm may also be triggered when the tape node determines, based on its sensor data, that movement has stopped, thereby verifying a new location of ULD pallet 1302.

The sensor data in the gateway node and/or the tape node (e.g., anchor-slot tape node 1306, anchor-slot tape node 1900, anchor-slot tape node 2000, anchor-ring tape node 2100, leashed tape node 2200, and companion tape node 1502) may also trigger detection of other nearby tape nodes (e.g., tape nodes on assets 1304 or other gateway nodes such as gateway node 1314 of FIG. 13), where by the tape node then attempts to send information of the other tape nodes to cloud-based server 1322 (e.g., server 804 of FIG. 8 via network communications environment 800).

Computer Apparatus

Figure 23:
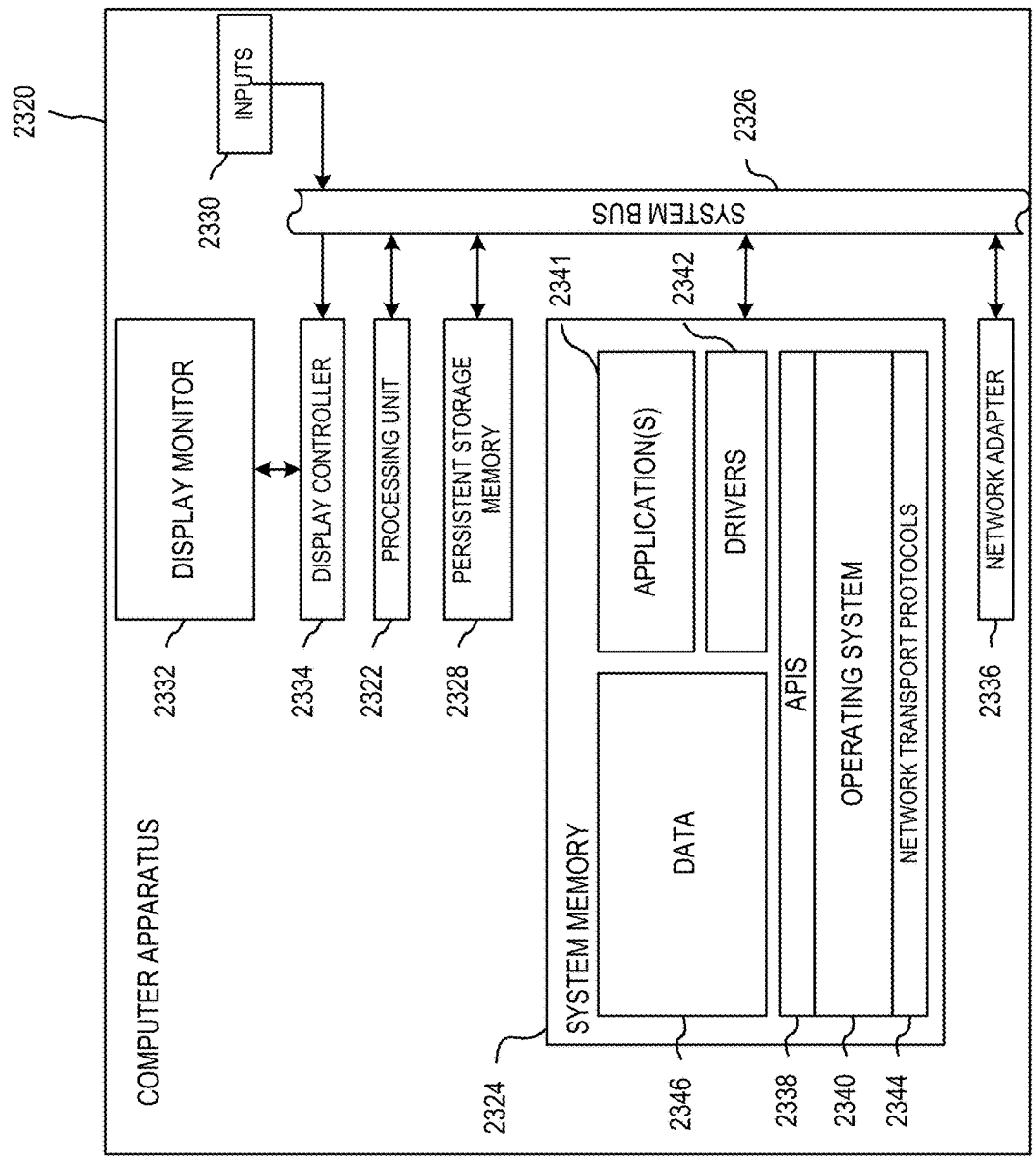
FIG. 23 shows one example computer apparatus that, either alone or in combination with one or more other computing apparatus, is operable to implement one or more of the computer systems described in this specification, in embodiments.

FIG. 23 shows an example embodiment of computer apparatus 2320 that, either alone or in combination with one or more other computing apparatus, is operable to implement one or more of the computer systems described in this specification. For example, computer apparatus 2320 may represent any of a phone, a mobile device, a smartphone, wireless transducing circuit 410 of FIG. 4, segment 640 of FIG. 6A, segment 670 of FIG. 6B, segment 680 of FIG. 6C, tracking circuit 778 of FIGS. 7A and 7B, mobile gateways 810, 812, and stationary gateway 814 of FIG. 8, network service servers 904, long-range tape node 982, medium range tape node 976, and short-range tape node 972 of FIG. 9A, master node 1051, nodes 1020 and 1026 of FIG. 10A, nodes 1034 and 1038 of FIG. 10B, peripheral nodes 1058, 1060, 1062 of FIG. 10C, anchor-slot tape node 1306, gateway node 1314, and cloud based server 1322 of FIG. 13, companion tape node 1502 of FIGS. 15A and 15B, anchor-slot tape node 2000 of FIGS. 20A and 20B, wireless tracking circuit 2110 of FIG. 21, and wireless tracking circuit 2206 of FIGS. 22A and 22B. The computer apparatus 2320 includes a processing unit 2322, a system memory 2324, and a system bus 2326 that couples the processing unit 2322 to the various components of the computer apparatus 2320. The processing unit 2322 may include one or more data processors, each of which may be in the form of any one of various commercially available computer processors. The system memory 2324 includes one or more computer-readable media that typically are associated with a software application addressing space that defines the addresses that are available to software applications. The system memory 2324 may include a read only memory (ROM) that stores a basic input/output system (BIOS) that contains start-up routines for the computer apparatus 2320, and a random-access memory (RAM). The system bus 2326 may be a memory bus, a peripheral bus, or a local bus, and may be compatible with any of a variety of bus protocols, including PCI, VESA, Microchannel, ISA, and EISA. The computer apparatus 2320 also includes a persistent storage memory 2328 (e.g., a hard drive, a floppy drive, a CD ROM drive, magnetic tape drives, flash memory devices, and digital video disks) that is connected to the system bus 2326 and contains one or more computer-readable media disks that provide non-volatile or persistent storage for data, data structures and computer-executable instructions.

A user may interact (e.g., input commands or data) with the computer apparatus 2320 using one or more input devices 2330 (e.g. one or more keyboards, computer mice, microphones, cameras, joysticks, physical motion sensors, and touch pads). Information may be presented through a graphical user interface (GUI) that is presented to the user on a display monitor 2332, which is controlled by a display controller 2334. The computer apparatus 2320 also may include other input/output hardware (e.g., peripheral output devices, such as speakers and a printer). The computer apparatus 2320 connects to other network nodes through a network adapter 2336 (also referred to as a "network interface card" or NIC).

A number of program modules may be stored in the system memory 2324, including application programming interfaces 2338 (APIs), an operating system (OS) 2340 (e.g., the Windows® operating system available from Microsoft Corporation of Redmond, Washington U.S.A.), software applications 2341 including one or more software applications programming the computer apparatus 2320 to perform one or more of the steps, tasks, operations, or processes of the positioning and/or tracking systems described herein, drivers 2342 (e.g., a GUI driver), network transport protocols 2344, and data 2346 (e.g., input data, output data, program data, a registry, and configuration settings).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

Features described above as well as those claimed below may be combined in various ways without departing from the scope hereof. The following enumerated examples illustrate some possible, non-limiting combinations:

(A1) An anchor-slot tape node for tracking a unit load device (ULD) pallet having an anchor-slot formed around a perimeter thereof, including: a circuit board configured with a processor, memory, sensors, and a low-power wireless communication interface; a stiffener positioned over the circuit board; a battery positioned beneath the circuit board; and an outer casing enclosing the battery, the circuit board, and the stiffener; wherein the anchor-slot tape node is shaped and sized to fit within the anchor-slot and to be retained within the anchor-slot by friction between the outer casing and internal structure of the anchor-slot.

(A2) In embodiments of (A1), the anchor-slot tape node having at least three circular areas joined by a linear strip, where the circular areas are sized and spaced to align with circular apertures of the anchor-slot and wherein the linear strip is sized to fit through a continuous top opening of the anchor-slot.

(A3) In embodiments of either (A1) or (A2), the circular areas being defined by circular areas of the circuit board, the battery being circular and positioned beneath a corresponding one of the circular areas of the circuit board.

(A4) Any of embodiments (A1)-(A3) further including an additional battery positioned beneath another one of the circular areas of the circuit board.

(A5) In any of embodiments (A1)-(A4), the anchor-slot tape node occupying five of the circular apertures of the anchor-slot.

(A6) In any of embodiments (A1)-(A5), the anchor-slot tape node having two batteries.

(A7) In any of embodiments (A1)-(A6), the anchor-slot tape node occupying eight of the circular apertures of the anchor-slot.

(A8) In any of embodiments (A1)-(A7), the anchor-slot tape node having eight batteries.

(A9) Any of embodiments (A1)-(A8) further including an insulating layer between the stiffener and the circuit board when the stiffener is an electrically conductive material.

(A10) In any of embodiments (A1)-(A9), the circuit board including a break tab with a break-point at one end of the circuit board, the break tab forming a circuit that inhibits activation of the anchor-slot tape node, the anchor-slot tape node activating when the break tab is manually broken at the break-point.

(A11) In any of embodiments (A1)-(A10), the outer casing including a polyolefin heat-shrink tube that is shrunk and flattened at each end to form a flexible flute that is wider at a distal end than a first width between lips of a continuous top opening of the anchor-slot.

(A12) In any of embodiments (A1)-(A11), the flexible flutes being manually deformable to pass through the lips as the anchor-slot tape node is inserted into the anchor-slot, the flexible flutes returning to a flat state when released to retain the anchor-slot tape node within the anchor-slot.

(A13) In any of embodiments (A1)-(A12), the outer casing further including a clear coating covering at least one of a QR code and a label positioned on at top surface of the outer casing.

(A14) In any of embodiments (A1)-(A13), the clear coating being a clear polyolefin heat-shrink tube.

(A15) In any of embodiments (A1)-(A14), the QR code defining a unique identifier of the anchor-slot tape node.

(A16) In any of embodiments (A1)-(A15), the anchor-slot tape node having a height that is less or equal to a depth of the anchor-slot.

(A17) In any of embodiments (A1)-(A16), the outer casing including a semi-rigid molded plastic material shaped and sized to fit through a continuous top opening of the anchor-slot with friction.

(A18) Any of embodiments (A1)-(A17) further including a shunt positioned at one end of the outer casing to inhibit activation of the anchor-slot tape node, wherein the shunt is manually operable to activate the anchor-slot tape node.

(A19) Any of embodiments (A1)-(A18) further including a communication interface for relaying data to a cloud-based server via one or more of a tape node on a different asset, a gateway node, and a client device within wireless range of the anchor-slot tape node.

(A20) In any of embodiments (A1)-(A19), the data including a current location of the ULD pallet.

(B1) A system for tracking a unit load device (ULD) pallet, including: a cloud based server; an anchor-slot tape node shaped and sized to be retained within an anchor-slot of the ULD pallet; and a gateway node; wherein, when in communication range, the anchor-slot tape node and the gateway node form a mesh network that allows the anchor-slot tape node to communicate with the cloud based server to track the ULD pallet.

(B2) Embodiments of (B1) further including a companion tape node having an adhesive surface for attaching to the ULD pallet within a recessed area at an edge of the ULD pallet, wherein the anchor-slot tape node communicates with the gateway node via the companion node.

(B3) In either of embodiments (B1) or (B2), wherein the gateway node is implemented as an adhesive tape agent platform.

(B4) In any of the embodiments (B1)-(B3), wherein the gateway node is positioned on one of a mobile asset and a ULD container.

(C1) A system for tracking a unit load device (ULD) pallet, including: an anchor-slot tape node shaped and sized to be retained within an anchor-slot of the ULD pallet; and a companion tape node having an adhesive surface for attaching to the ULD pallet within a recessed area at an edge of the ULD pallet; wherein the companion tape node communicate with a cloud based server via a mesh network including a gateway node to track the ULD pallet.

(C2) In embodiments of (C1), wherein the anchor-slot tape node communicates with the companion tape node using Bluetooth Low Energy protocol.

(D1) An anchor-ring tape node for tracking a unit load device (ULD) pallet having an anchor-slot formed around a perimeter thereof, including: an anchor portion shaped and sized to be secured within the anchor-slot; a stem portion mechanically coupled with the anchor portion and forming a housing that includes a wireless tracking circuit; and a ring portion mechanically coupled with the stem portion and for coupling with a restraint for securing assets to the ULD pallet; wherein the anchor-ring tape node mechanically couples with the restraint and tracks the ULD pallet by wirelessly communication with a mesh network of a wireless tracking system.

(D2) In embodiments of (D1), the ring portion being one of a loop, a hook, and a ratchet for mechanically coupling with one of a rope, a net, and a strap.

(E1) A leashed tape node for tracking a unit load device (ULD) pallet having an anchor-slot formed around a perimeter thereof, including: an anchor portion shaped and sized to be secured within the anchor-slot; a flexible tether mechanically coupled with the anchor portion; and a rugged housing mechanically attached to the flexible tether and forming a housing that includes a wireless tracking circuit; wherein the anchor portion mechanically couples with, and is retained by, the anchor-slot and the wireless tracking circuit tracks the ULD pallet by wirelessly communication with a mesh network of a wireless tracking system.

(E2) In embodiments of (E1), the flexible tether allowing the rugged housing to be positioned near to the ULD pallet without impeding a top surface of the ULD pallet.

(E3) In either of embodiments (E1) or (E2), the rugged housing being one of spherical, cuboid, and cylindrical.

What is claimed is:

1. An anchor-slot tape node, comprising:
   a circuit board configured with a processor, memory, sensors, and a low-power wireless communication interface;
   a stiffener positioned over the circuit board;
   a battery positioned beneath the circuit board; and
   an outer casing enclosing the battery, the circuit board, and the stiffener, shaped and sized to fit within, and to be retained within, an anchor-slot of a unit load device (ULD) by friction between the outer casing and internal structure of the anchor-slot;
   wherein the anchor-slot tape node is shaped and sized to fit within, and to be retained within, an anchor-slot of a unit load device (ULD) by friction between the outer casing and internal structure of the anchor-slot.

2. The anchor-slot tape node of claim 1, the anchor-slot tape node having at least three circular areas joined by a linear strip, where the circular areas are sized and spaced to align with circular apertures of the anchor-slot and wherein the linear strip is sized to fit through a continuous top opening of the anchor-slot.

3. The anchor-slot tape node of claim 2, the circular areas being defined by circular areas of the circuit board, the battery being circular and positioned beneath a corresponding one of the circular areas of the circuit board.

4. The anchor-slot tape node of claim 3, further comprising an additional battery positioned beneath another one of the circular areas of the circuit board.

5. The anchor-slot tape node of claim 2, the anchor-slot tape node occupying five of the circular apertures of the anchor-slot.

6. The anchor-slot tape node of claim 5, the anchor-slot tape node having two batteries.

7. The anchor-slot tape node of claim 2, the anchor-slot tape node occupying eight of the circular apertures of the anchor-slot.

8. The anchor-slot tape node of claim 7, the anchor-slot tape node having eight batteries.

9. The anchor-slot tape node of claim 1, further comprising an insulating layer between the stiffener and the circuit board when the stiffener is an electrically conductive material.

10. The anchor-slot tape node of claim 1, the circuit board comprising a break tab with a break-point at one end of the circuit board, the break tab forming a circuit that inhibits activation of the anchor-slot tape node, the anchor-slot tape node activating when the break tab is manually broken at the break-point.

11. The anchor-slot tape node of claim 1, the outer casing comprising a polyolefin heat-shrink tube that is shrunk and flattened at each end to form a flexible flute that is wider at a distal end than a first width between lips of a continuous top opening of the anchor-slot.

12. The anchor-slot tape node of claim 11, the flexible flutes being manually deformable to pass through the lips as the anchor-slot tape node is inserted into the anchor-slot, the flexible flutes returning to a flat state when released to retain the anchor-slot tape node within the anchor-slot.

13. The anchor-slot tape node of claim 1, the outer casing further comprising a clear coating covering at least one of a QR code and a label positioned on at top surface of the outer casing.

14. The anchor-slot tape node of claim 13, the clear coating being a clear polyolefin heat-shrink tube.

15. The anchor-slot tape node of claim 13, the QR code defining a unique identifier of the anchor-slot tape node.

16. The anchor-slot tape node of claim 1, the anchor-slot tape node having a height that is less or equal to a depth of the anchor-slot.

17. The anchor-slot tape node of claim 1, the outer casing comprising a semi-rigid molded plastic material shaped and sized to fit through a continuous top opening of the anchor-slot with friction.

18. The anchor-slot tape node of claim 17, further comprising a shunt positioned at one end of the outer casing to inhibit activation of the anchor-slot tape node, wherein the shunt is manually operable to activate the anchor-slot tape node.

19. The anchor-slot tape node of claim 1, further comprising a communication interface for relaying data to a cloud-based server via one or more of a tape node on a different asset, a gateway node, and a client device within wireless range of the anchor-slot tape node.

20. The anchor-slot tape node of claim 19, wherein the data includes a current location of the ULD.

21. An anchor-slot tape node, comprising:
    a circuit board configured with a processor, memory, sensors, and a low-power wireless communication interface;
    a stiffener positioned over the circuit board;
    a battery positioned beneath the circuit board; and an outer casing enclosing the battery, the circuit board, and the stiffener;

wherein the anchor-slot tape node includes at least one circular area that is shaped and sized to fit within, and to be retained within, a circular aperture of an anchor-slot of a unit load device (ULD) by friction between the outer casing and internal structure of the anchor-slot.

22. The anchor-slot tape node of claim 21, the battery being circular and positioned within the at least one circular area such that the battery is positioned inside the anchor-slot when the anchor-slot tape node is installed in the anchor-slot.

23. The anchor-slot tape node of claim 21, wherein the anchor-slot tape node includes a plurality of circular areas sized and spaced to align with circular apertures of the anchor-slot.

24. An anchor-slot tape node, comprising:
a circuit board configured with a processor, memory, sensors, and a low-power wireless communication interface;
a stiffener positioned over the circuit board;
a battery positioned beneath the circuit board;
an outer casing enclosing the battery, the circuit board, and the stiffener;
wherein the anchor-slot tape node is shaped and sized to fit within, and to be retained within, an anchor-slot of a unit load device (ULD) by friction between the outer casing and internal structure of the anchor-slot; and
wherein the anchor-slot tape node has a height that is less or equal to a depth of the anchor-slot.

* * * * *